(12) United States Patent
Jiang et al.

(10) Patent No.: US 8,856,384 B2
(45) Date of Patent: Oct. 7, 2014

(54) SYSTEM AND METHODS FOR MANAGING NETWORK PROTOCOL ADDRESS ASSIGNMENT WITH A CONTROLLER

(75) Inventors: Kanzhe Jiang, Los Altos Hills, CA (US); Shudong Zhou, Fremont, CA (US); Robert Edward Adams, San Mateo, CA (US); Mandeep Singh Dhami, San Jose, CA (US); Alexander Stafford David Reimers, Palo Alto, CA (US)

(73) Assignee: Big Switch Networks, Inc., Santa Clara, CA (US)

( * ) Notice: Subject to any disclaimer, the term of this patent is extended or adjusted under 35 U.S.C. 154(b) by 260 days.

(21) Appl. No.: 13/274,157

(22) Filed: Oct. 14, 2011

(65) Prior Publication Data

US 2013/0097335 A1  Apr. 18, 2013

(51) Int. Cl.
| | | |
|---|---|---|
| G06F 15/16 | (2006.01) | |
| H04L 29/12 | (2006.01) | |
| H04L 29/06 | (2006.01) | |

(52) U.S. Cl.
CPC ....... *H04L 61/2528* (2013.01); *H04L 29/12283* (2013.01); *H04L 29/12226* (2013.01); *H04L 61/2076* (2013.01); *H04L 29/12301* (2013.01); *H04L 61/2015* (2013.01); *H04L 61/2061* (2013.01); *H04L 69/22* (2013.01)
USPC ........... 709/245; 709/202; 709/219; 709/220; 709/226; 709/228; 709/230; 709/244

(58) Field of Classification Search
USPC ......... 709/202, 220, 226, 228, 230, 245, 244, 709/219
See application file for complete search history.

(56) References Cited

U.S. PATENT DOCUMENTS

| | | |
|---|---|---|
| 6,424,654 B1 | 7/2002 | Daizo |
| 6,937,602 B2 | 8/2005 | Whitehill et al. |
| 7,231,660 B1 | 6/2007 | Daude et al. |

(Continued)

FOREIGN PATENT DOCUMENTS

| | | |
|---|---|---|
| DE | 102005006889 | 8/2006 |
| EP | 1613023 | 1/2006 |
| EP | 1615405 | 1/2006 |
| EP | 1780943 | 5/2007 |

OTHER PUBLICATIONS

Pfaff et al., OpenFlow Switch Specification, Dec. 31, 2009, 42 pages.

(Continued)

*Primary Examiner* — Michael Y Won
(74) *Attorney, Agent, or Firm* — Treyz Law Group; Chuh-Yun Wu; Michael H. Lyons

(57) ABSTRACT

A controller may help reduce network traffic that is associated with broadcasting of Dynamic Host Configuration Protocol (DHCP) packets by converting broadcast DHCP packets into unicast DHCP packets and forwarding the unicast DHCP packets to appropriate DHCP servers. The servers may be identified from a database of servers that is updated with DHCP server address information based on DHCP reply packets that are received by the controller from servers in the network. To convert DHCP request packets into unicast packets, the controller may modify address header fields of the packets such as Ethernet addresses and Internet Protocol (IP) addresses. The controller may forward the modified DHCP request packets to the server by providing packet forwarding rules such as flow table entries to the switches or by forwarding the modified DHCP request packets through the controller.

3 Claims, 22 Drawing Sheets

(56) References Cited

U.S. PATENT DOCUMENTS

| | | | |
|---|---|---|---|
| 7,260,648 | B2 | 8/2007 | Tingley et al. |
| 7,318,089 | B1 | 1/2008 | Stachura et al. |
| 7,337,224 | B1 | 2/2008 | Van Horne |
| 7,386,629 | B2* | 6/2008 | Rover et al. ............ 709/238 |
| 7,729,284 | B2* | 6/2010 | Ukrainetz et al. ......... 370/254 |
| 7,937,494 | B2 | 5/2011 | Droms et al. |
| 8,046,452 | B2* | 10/2011 | Hovell et al. ............. 709/224 |
| 8,099,764 | B2* | 1/2012 | Herzog et al. ............... 726/4 |
| 8,238,315 | B2* | 8/2012 | Lambert .................. 370/338 |
| 2005/0091387 | A1* | 4/2005 | Abe ........................ 709/228 |
| 2006/0212560 | A1 | 9/2006 | Purser |
| 2006/0221925 | A1 | 10/2006 | Beathard |
| 2007/0250608 | A1* | 10/2007 | Watt ........................ 709/222 |
| 2007/0286209 | A1 | 12/2007 | Wang et al. |
| 2008/0008148 | A1 | 1/2008 | Sagawa |
| 2008/0063002 | A1* | 3/2008 | Zheng et al. ............. 370/401 |
| 2008/0101381 | A1 | 5/2008 | Sun et al. |
| 2008/0189769 | A1 | 8/2008 | Casado et al. |
| 2008/0239956 | A1 | 10/2008 | Okholm et al. |
| 2009/0138577 | A1* | 5/2009 | Casado et al. ............ 709/220 |
| 2009/0310582 | A1 | 12/2009 | Beser et al. |
| 2010/0082779 | A1 | 4/2010 | Min |
| 2010/0180016 | A1* | 7/2010 | Bugwadia et al. ........ 709/220 |
| 2010/0228879 | A1 | 9/2010 | Wiget et al. |
| 2011/0069621 | A1 | 3/2011 | Gintis et al. |
| 2013/0024553 | A1* | 1/2013 | Mittal et al. ............... 709/222 |
| 2013/0034104 | A1 | 2/2013 | Yedavalli et al. |
| 2013/0097335 | A1* | 4/2013 | Jiang et al. ............... 709/245 |
| 2013/0125124 | A1* | 5/2013 | Kempf et al. ................ 718/1 |
| 2013/0268801 | A1* | 10/2013 | Yamato .................. 714/4.11 |

OTHER PUBLICATIONS

McKeown et al., OpenFlow: Enabling Innovation in Campus Networks, Mar. 14, 2008, 6 pages.

Cisco Systems, Cisco Catalyst 6500 Architecture, 1992-2007, 28 pages.

Adams et al., U.S. Appl. No. 13/220,431, filed Aug. 29, 2011.

Casado et al., "SANE: A Protection Architecture for Enterprise Networks," Usenix Security, Aug. 2006 (15 pages).

Casado et al., "Ethane: Taking Control of the Enterprise," Conference of Special Interest Group on Data Communication (SIGCOMM), Japan, Aug. 2007 (12 pages).

Koponen et al., "Onix: A Distributed Control Platform for Large-scale Production Networks," Usenix Security, Oct. 2010 (14 pages).

Sherwood et al. "FlowVisor: A Network Virtualization Layer," Open Flow Technical Reports, Oct. 14, 2009 (Abstract and 14 pages) [Retrieved on Jan. 4, 2011]. Retrieved from the Internet<URL: http://openflowswitch.org/downloads/technicalreports/openflow-tr-2009-1-flowvisor.pdf.

Casado et al., "Ripcord: A Modular Platform for Data Center Networking", [Retrieved on Sep. 13, 2011]. Retrieved from the Internet<URL:http://www.eecs.berkeley.edu/Pubs/TechRpts/2010/EECS-2010-93.html.

* cited by examiner

| PHYSICAL INPUT PORT | SOURCE ETHERNET ADDRESS | DESTINATION ETHERNET ADDRESS | SOURCE IP ADDRESS | DESTINATION IP ADDRESS | SOURCE TCP PORT | DESTINATION TCP PORT | ACTION |
|---|---|---|---|---|---|---|---|
| * | * | 00:1FAB | * | * | * | * | SEND TO PORT 3 |
| * | * | * | * | 172.12.3.4 | * | * | SEND TO PORT 4 |
| * | * | * | * | * | * | 80 | DROP |

FIG. 6B

| ... | DESTINATION IP ADDRESS | ... | ACTION |
|---|---|---|---|
| ... | 172.12.3.4 | ... | SEND TO PORT 3 |

FIG. 6C

| ... | DESTINATION IP ADDRESS | ... | ACTION |
|---|---|---|---|
| ... | 172.12.3.4 | ... | SEND TO PORT 5 |

FIG. 6D

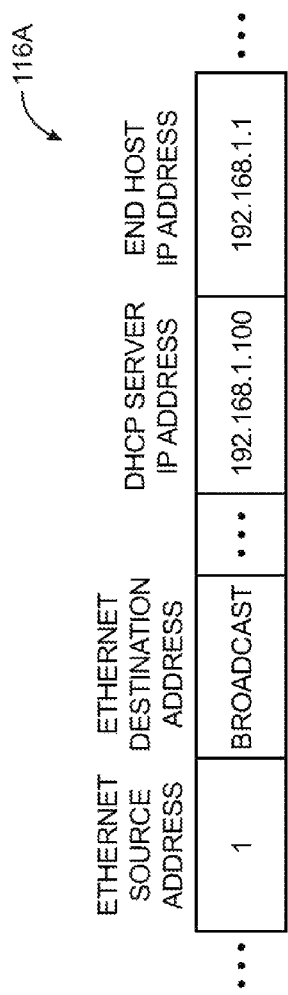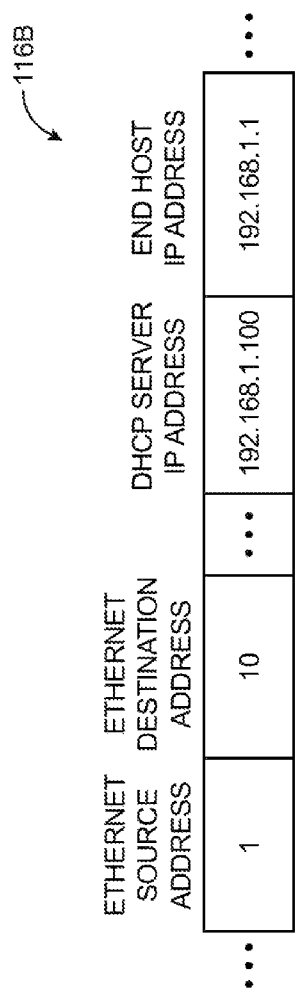

SYSTEM AND METHODS FOR MANAGING NETWORK PROTOCOL ADDRESS ASSIGNMENT WITH A CONTROLLER

BACKGROUND

This relates to communication networks, and more particularly, to using a controller to control network traffic associated with network address assignment in a network.

Packet-based networks such as the internet and local data networks that are connected to the internet include network switches. Network switches are used in forwarding packets from packet sources to packet destinations. The packets may be sometimes referred to as frames.

It can be difficult or impossible to control the switches of one vendor using the equipment of another vendor. This is because the switch equipment of one vendor may use a different operating system and set of control procedures than the switch equipment of another vendor. To address the challenges associated with controlling different types of switch platforms, cross-platform protocols have been developed. These protocols allow centralized control of otherwise incompatible switches.

Cross-platform controller clients can be included on the switches in a network. The controller clients are able to communicate with a corresponding controller server over network paths. Because the controller clients can be implemented on a variety of switch hardware, it is possible for a single controller to control switch equipment that might otherwise be incompatible.

End hosts in the network may communicate by sending network packets through the switches. Each of the network packets has packet header fields that include source Internet Protocol (IP) address information and/or other protocol address information. The source IP address information of a given network packet identifies which end host sent that network packet. To communicate with other end hosts, each end host must first obtain a corresponding IP address from the network. The network may include one or more servers that distribute IP addresses to end hosts in the network. The servers can distribute IP addresses using the Dynamic Host Configuration Protocol (DHCP). To obtain an IP address, an end host floods the network with DHCP discovery request packets that may reach every other end host in the network. DHCP servers that receive the discovery request can reply with a DHCP offer packet that informs the end host of an available IP address for the end host to use. The end host may accept an available IP address from among the DHCP offer packets by flooding the network with a DHCP offer request packet that informs the DHCP servers which of the offered IP address was accepted by the end host.

Flooding of a network to send DHCP requests can undesirably load the network with unnecessary network traffic because the DHCP requests can be sent to end hosts that are not DHCP servers. The forwarding of unnecessary DHCP requests can impact performance of switches in the network. It would therefore be desirable to be able to provide improved arrangements for performing address assignment to end hosts in a network.

SUMMARY

A controller such as a controller server may be used to control switches in a network. The controller may help reduce network traffic that is associated with broadcasting of Dynamic Host Configuration Protocol (DHCP) requests (e.g., or other requests that request assignment of a protocol address to an end host) by identifying network packets that are associated with the DHCP protocol and processing the identified network packets. The controller may identify which of the network packets are DHCP request packets by retrieving information from packet header fields of the network packets.

In response to identifying that a network packet received from an end host is a DHCP request packet, the controller may process the DHCP request packet by identifying an appropriate server (e.g., a DHCP server or a DHCP relay agent) that is capable of assigning a protocol address to the end host and forwarding the DHCP request packet to the server. The server may be identified by selecting the server from a database of servers. The database may be updated based on DHCP reply packets that are received by the controller from servers in the network. For example, the controller may store address information such as hardware addresses and protocol addresses of the servers that are retrieved from packet header fields of the DHCP reply packets. The stored address information may be used to identify servers to fulfill future DHCP request packets.

The controller may modify the DHCP request packet to convert the DHCP request packet from a broadcast packet into a unicast packet that is destined for the server. To convert the DHCP request packet into a unicast packet, the controller may modify address header fields of the packet such as Ethernet addresses and Internet Protocol (IP) addresses. For example, the controller may store a hardware address of the server in a destination address field of the packet. The controller may determine whether to modify Ethernet addresses or IP addresses of the packet based on network topology information. For example, the controller may modify an Ethernet destination address field of the packet in response to determining that the end host and the server are located in the same subnetwork. As another example, the controller may modify an IP destination address field of the packet in response to determining that the end host and the server are located in different subnetworks. The controller may forward the modified DHCP request packet to the server by providing packet forwarding rules such as flow table entries to the switches or by forwarding the modified DHCP request packet through the controller to a switch that is coupled to the server.

Further features of the present invention, its nature and various advantages will be more apparent from the accompanying drawings and the following detailed description.

BRIEF DESCRIPTION OF THE DRAWINGS

FIG. 6B is a diagram of an illustrative flow table of the type that may be used by a packet processing system showing three illustrative types of packet forwarding that may be performed based on the flow table entries of the flow table in accordance with an embodiment of the present invention.

FIG. 6C is a diagram of an illustrative flow table in which packets with a particular address are forwarded to the third physical port in a switch in accordance with an embodiment of the present invention.

FIG. 6D is a diagram of an illustrative flow table in which packets with a particular address are forwarded to the fifth physical port in a switch in accordance with an embodiment of the present invention.

FIG. 9D is an illustrative DHCP offer request packet that may be sent by an end host in response to a DHCP server offer reply in accordance with an embodiment of the present invention.

FIG. 9E is an illustrative controller-modified DHCP offer request packet that may be forwarded directly to a DHCP server in accordance with an embodiment of the present invention.

DETAILED DESCRIPTION

Networks such as the internet and the local and regional networks that are coupled to the internet rely on packet-based switches. These switches, which are sometimes referred to herein as network switches, packet processing systems, or packet forwarding systems can forward packets based on address information. In this way, data packets that are transmitted by a packet source may be delivered to a packet destination. In network terms, packet sources and destinations are sometimes referred to as end hosts. Examples of end hosts are personal computers, servers, and other computing equipment.

Network switches range in capability from relatively small Ethernet switches and wireless access points to large rack-based systems that include multiple line cards, redundant power supplies, and supervisor capabilities. It is not uncommon for networks to include equipment from multiple vendors. Network switches from different vendors can be interconnected to form a packet forwarding network, but can be difficult to manage in a centralized fashion due to incompatibilities between their operating systems and control protocols.

These potential incompatibilities can be overcome by incorporating a common cross-platform control module (sometimes referred to herein as a controller client) into each network switch. A centralized cross-platform controller server may interact with each of the control clients over respective network links. The use of a cross-platform controller server and corresponding controller clients allows potentially disparate network switch equipment to be centrally managed.

Figure 1:
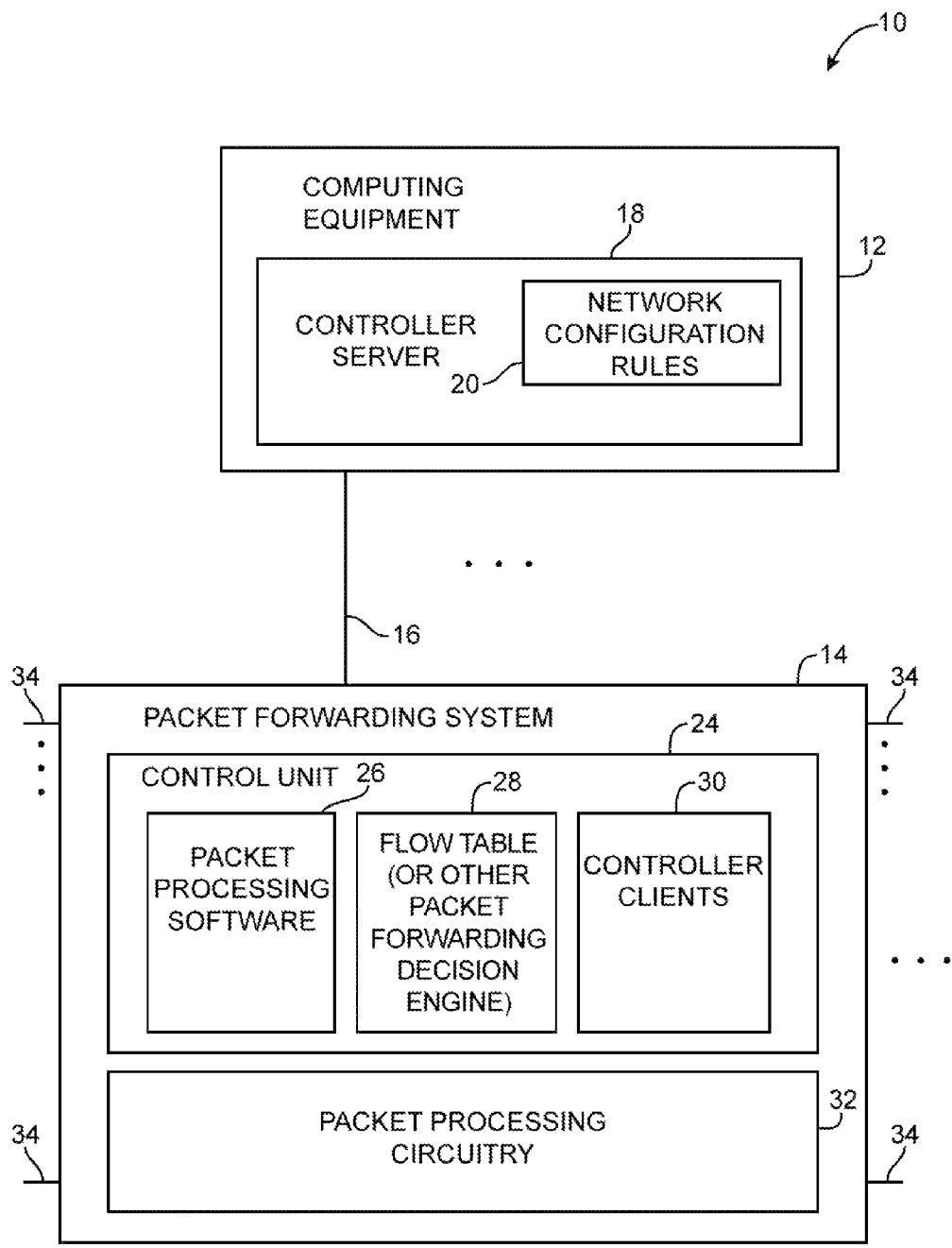
FIG. 1 is a diagram of an illustrative network that includes a controller and a packet forwarding system in accordance with an embodiment of the present invention.

With one illustrative configuration, which is sometimes described herein as an example, centralized control is provided by one or more controller servers such as controller server 18 of FIG. 1. Control server 18 may be implemented on a stand-alone computer, on a cluster of computers, on a set of computers that are distributed among multiple locations, on hardware that is embedded within a network switch, or on other suitable computing equipment 12. Controller server 18 can run as a single process on a single computer or can be distributed over several hosts for redundancy. The use of a distributed arrangement may help provide network 10 with resiliency against unexpected network partitions (e.g., a situation in which a network link between two campuses is disrupted).

In distributed controller arrangements, controller nodes can exchange information using an intra-controller protocol. For example, if a new end host connects to network hardware (e.g., a switch) that is only connected to a first controller node, that first controller node may use the intra-controller protocol to inform other controller nodes of the presence of the new end host. If desired, a switch or other network component may be connected to multiple controller nodes. Arrangements in which a single controller server is used to control a network of associated switches are sometimes described herein as an example.

Controller server 18 of FIG. 1 may gather information about the topology of network 10. For example, controller server 18 may send Link Layer Discovery Protocol (LLDP) probe packets through the network to discover the topology of network 10. Controller server 18 may use information on network topology and information on the capabilities of network equipment to determine appropriate paths for packets flowing through the network. Once appropriate paths have been identified, controller server 18 may send corresponding settings data to the hardware in network 10 to ensure that packets flow through the network as desired. Network configuration operations such as these may be performed during system setup operations, continuously in the background, or in response to the appearance of newly transmitted data packets (i.e., packets for which a preexisting path has not been established).

Controller server 18 may be used to implement network configuration rules 20. Rules 20 may specify which services are available to various network entities. As an example, rules 20 may specify which users (or type of users) in network 10 may access a particular server. Rules 20 may, for example, be maintained in a database at computing equipment 12.

Controller server 18 and controller clients 30 at respective network switches 14 may use network protocol stacks to communicate over network links 16.

Each switch (packet forwarding system) 14 may have input-output ports 34. Cables may be used to connect pieces of equipment to ports 34. For example, end hosts such as personal computers, web servers, and other computing equipment may be plugged into ports 34. Ports 34 may also be used to connect one of switches 14 to other switches 14.

Packet processing circuitry 32 may be used in forwarding packets from one of ports 34 to another of ports 34 and may be used in performing other suitable actions on incoming packets. Packet processing circuit 32 may be implemented using one or more integrated circuits such as dedicated high-speed switch circuits and may serve as a hardware data path. If desired, packet processing software 26 that is running on control unit 24 may be used in implementing a software data path.

Control unit 24 may include processing and memory circuits (e.g., one or more microprocessors, memory chips, and other control circuitry) for storing and running control software. For example, control unit 24 may store and run software such as packet processing software 26, may store flow table 28, and may be used to support the operation of controller clients 30.

Controller clients 30 and controller server 18, may be compliant with a network switch protocol such as the OpenFlow protocol (see, e.g., OpenFlow Switch Specification version 1.0.0). One or more clients among controller clients 30 may also be compliant with other protocols (e.g., the Simple Network Management Protocol). Using the OpenFlow protocol or other suitable protocols, controller server 18 may provide controller clients 30 with data that determines how switch 14 is to process incoming packets from input-output ports 34.

With one suitable arrangement, flow table data from controller server 18 may be stored in a flow table such as flow table 28. The entries of flow table 28 may be used in configuring switch 14 (e.g., the functions of packet processing circuitry 32 and/or packet processing software 26). In a typical scenario, flow table 28 serves as cache storage for flow table entries and a corresponding version of these flow table entries is embedded within the settings maintained by the circuitry of packet processing circuitry 32. This is, however, merely illustrative. Flow table 28 may serve as the exclusive storage for flow table entries in switch 14 or may be omitted in favor of flow table storage resources within packet processing circuitry 32. In general, flow table entries may be stored using any suitable data structures (e.g., one or more tables, lists, etc.). For clarity, the data of flow table 28 (whether maintained in a database in control unit 24 or embedded within the configuration of packet processing circuitry 32) is referred to herein as forming flow table entries (e.g., rows in flow table 28).

The example of flow tables 28 storing data that determines how switch 14 is to process incoming packets are merely illustrative. Any packet forwarding decision engine may be used to assist packet forwarding system 14 to make decisions about how to forward network packets. For example, packet forwarding decision engines 28 may direct packet forwarding system 14 to forward network packets to predetermined ports based on attributes of the network packets (e.g., based on network protocol headers).

Figure 2:
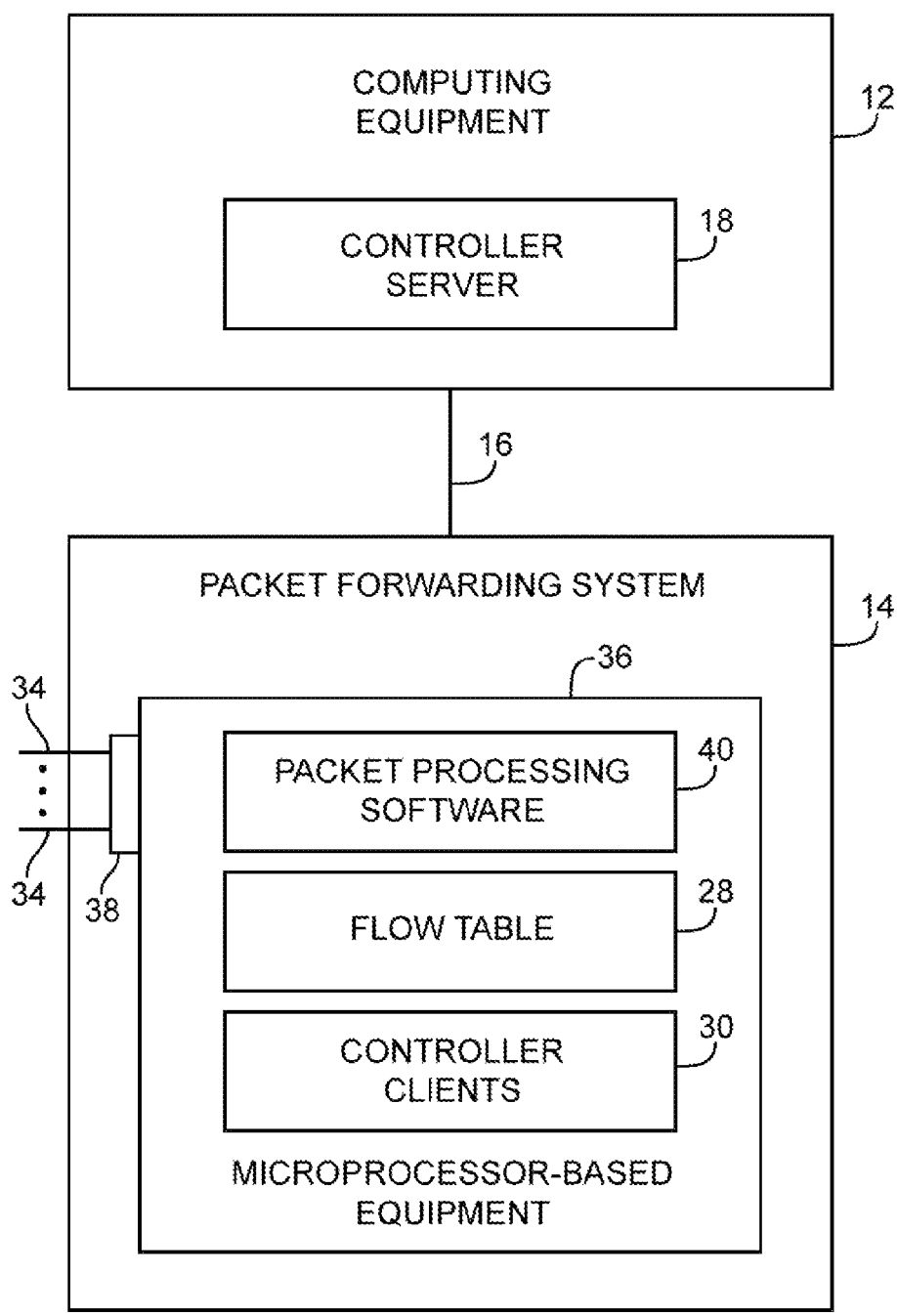
FIG. 2 is a diagram showing how a packet forwarding system may be implemented using microprocessor-based equipment that runs a packet processing engine in accordance with an embodiment of the present invention.

If desired, switch 14 may be implemented using a general purpose processing platform that runs control software and that omits packet processing circuitry 32 of FIG. 2. This type of configuration is shown in FIG. 2. As shown in the illustrative arrangement of FIG. 2, controller server 18 on computing equipment 12 may communicate with controller clients 30 on switch (packet forwarding system) 14 over network link 16. Controller server 18 may, for example, convey flow table entries to controller clients 30 that are maintained in flow table 28. Packet processing software 40 may use network interface 38 to forward and otherwise process packets (e.g., packets transmitted and received using ports 34). Network interface 38 may be implemented using one or more network interface cards that are plugged into a system board in switch 14 (as an example).

Figure 3:
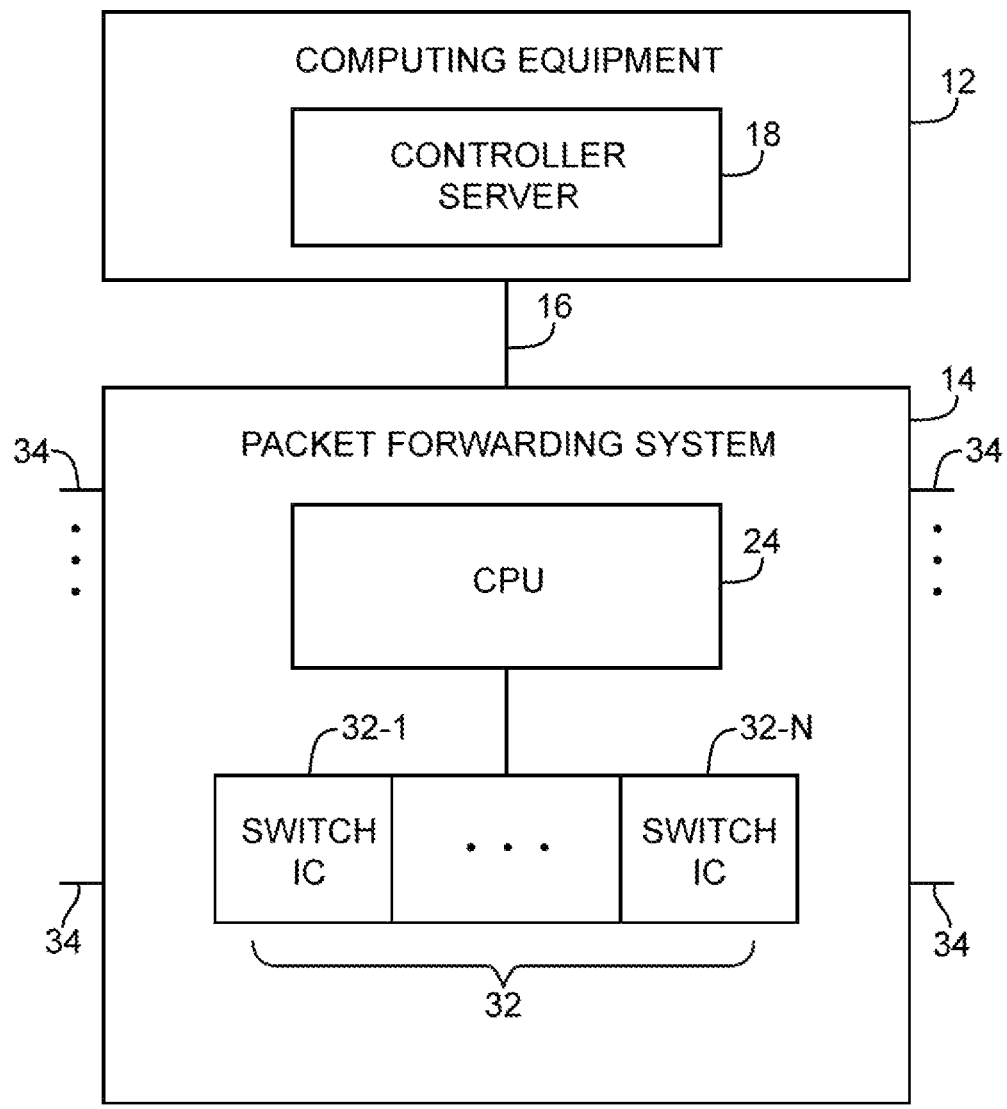
FIG. 3 is a diagram of a packet forwarding system and associated controller in which the packet forwarding system includes a control unit and associated switching integrated circuits in accordance with an embodiment of the present invention.

Network switches such as network switch 14 of FIG. 1 may be implemented using control circuitry that is coupled to one or more high-speed switching integrated circuits ("switch ICs"). This type of configuration is shown in FIG. 3. As shown in FIG. 3, controller server 18 on computing equipment 12 may communicate with network switch 14 via path 16. Switch 14 may include processing circuitry 24 and one or more associated switch ICs 32 such as switch IC 32-1 . . . switch IC 32-N. Control circuitry 24 may be, for example, based on a microprocessor and memory. Switch ICs 32-1 . . . 32-N may be dedicated switching circuits that are capable of handling packet processing tasks at high speeds. As an example, control circuitry 24 may be based on a 500 MHz microprocessor and switch ICs 32-1 . . . 32-N may be capable of handling data from 48 of input-output ports 34, each of which has an associated data rate of 1-10 Gbps (as an example).

Figure 4:
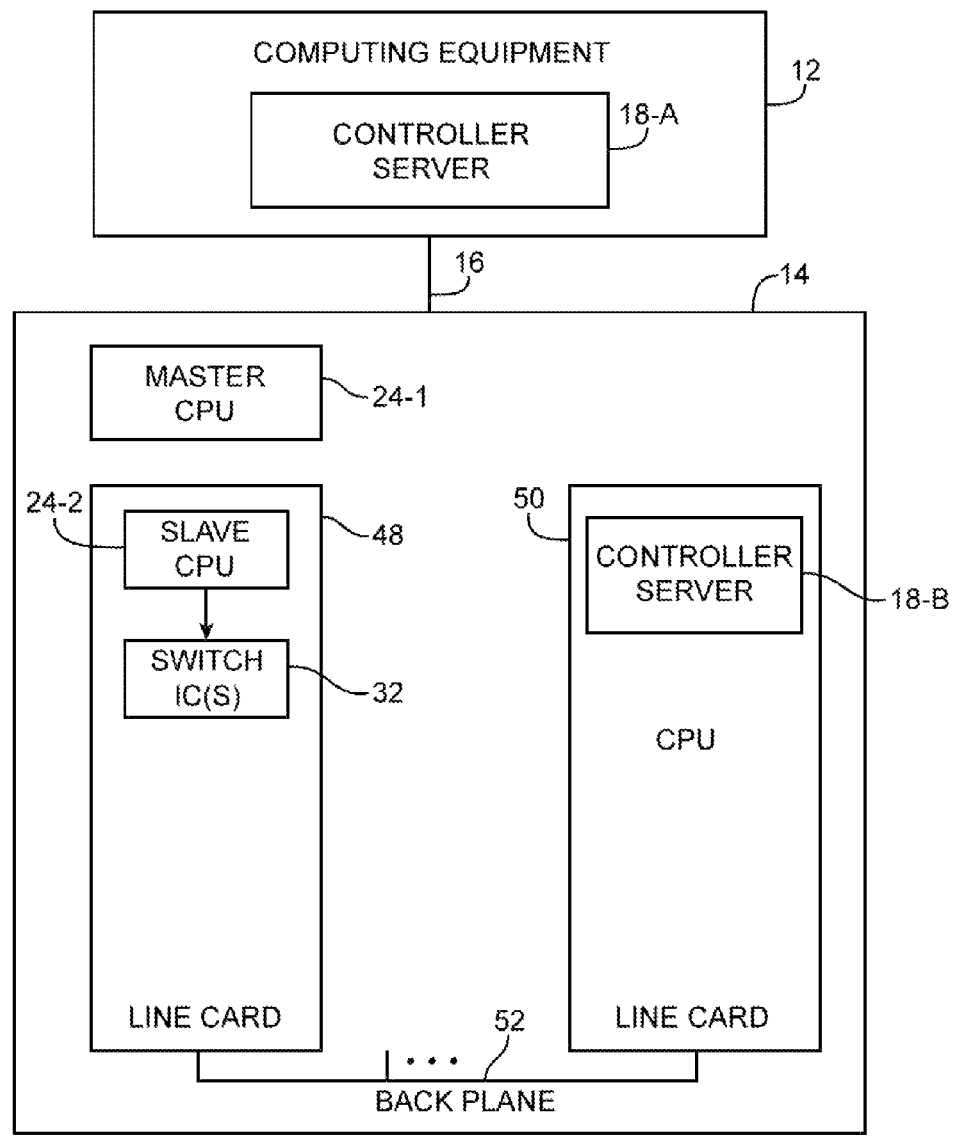
FIG. 4 is a diagram of a network in which a packet forwarding system has master and slave controllers and in which a controller server may be implemented on remote computing equipment or on a line card in the packet forwarding system in accordance with an embodiment of the present invention.

Another illustrative switch architecture that may be used in implementing network switch 14 of FIG. 1 is shown in FIG. 4. In the FIG. 4 example, switch (packet forwarding system) 14 may include a master processor such as processor 24-1 and one or more associated slave processors such as slave processor 24-2. Switch ICs 32 and slave processors such as processor 24-2 may be implemented on line cards such as line card 48. One or more line cards such as line card 50 may contain processing circuitry (e.g., a microprocessor and memory). Line cards 48 and 50 may be interconnected using backplane 52.

With an arrangement of the type shown in FIG. 4, the controller server may be implemented using the processing resources of a line card. For example, the controller server may be implemented on line card 50 as illustrated by controller server 18-B of FIG. 4. If desired, the controller server may be implemented on computing equipment 12 (e.g., as controller server 18-A of FIG. 4). Controller server 18-A or controller server 18-B may communicate with controller clients 30 that are implemented using processors such as processor 24-1 and/or 24-2. Communications between controller server 18-A and the controller clients may take place over network connection 16. Communications between controller server 18-B and the controller clients may take place over backplane 52 (e.g., over a network connection using a protocol such as TCP/IP).

Figure 5:
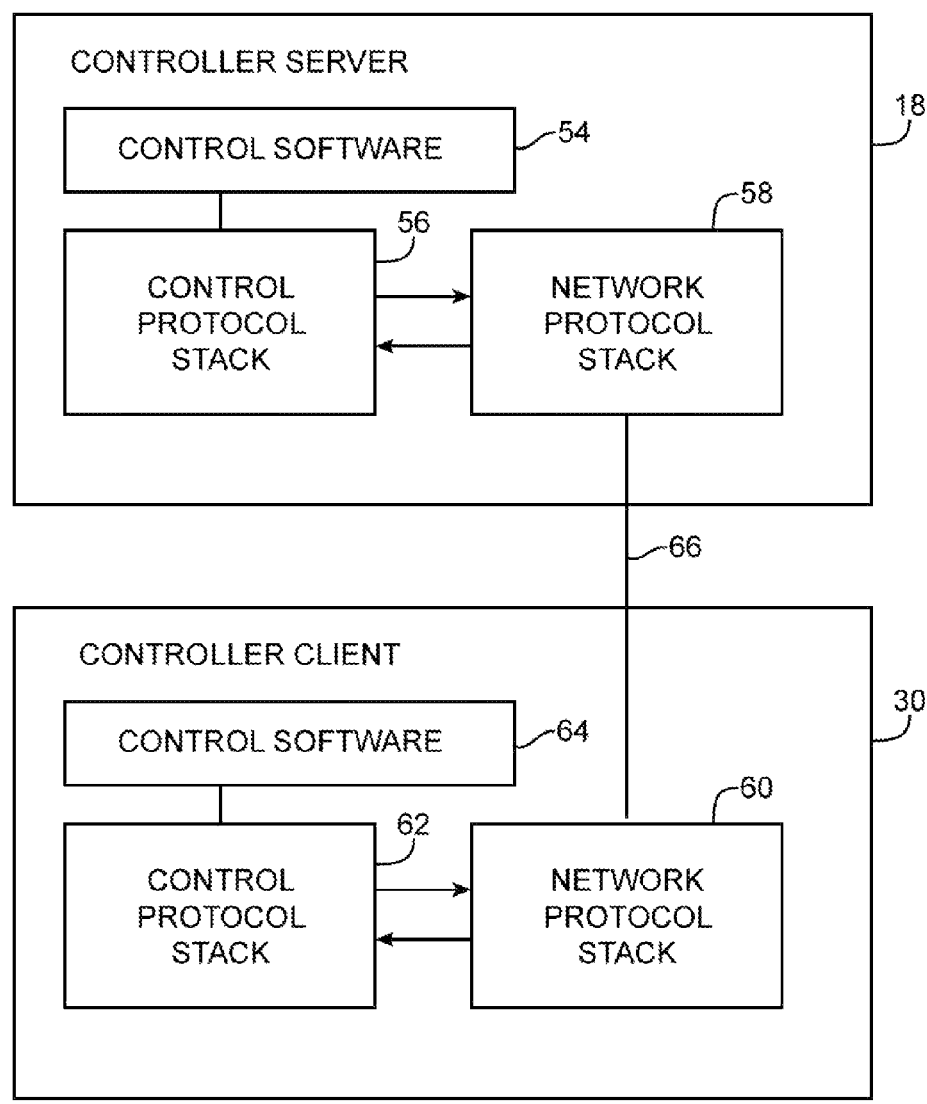
FIG. 5 is a diagram of a controller server and controller client that may communicate over a network connection in accordance with an embodiment of the present invention.

As shown in FIG. 5, controller server 18 and controller client 30 may communicate over network path 66 using network protocol stacks such as network protocol stack 58 and network protocol stack 60. Stacks 58 and 60 may be, for example Linux TCP/IP stacks or the TCP/IP stack in the VxWorks operating system (as examples). Path 66 may be, for example, a path that supports a network connection between switch 14 and external equipment (e.g., network path 16 of FIG. 1) or may be a path that supports a network connection in backplane 52 in switch 14, as shown in FIG. 4. Arrangements in which path 66 is network path such as path 16 are sometimes described herein as an example.

Control protocol stack 56 serves as an interface between network protocol stack 58 and control software 54. Control protocol stack 62 serves as an interface between network protocol stack 60 and control software 64. During operation, when controller server 18 is communicating with controller client 30, control protocol stacks 56 generate and parse control protocol messages (e.g., control messages to activate a port or to install a particular flow table entry into flow table 28). By using arrangements of the type shown in FIG. 5, a network connection is formed over the link between controller server 18 and controller client 30. Controller server 18 and controller client 30 can communicate using a Transmission Control Protocol (TCP) or User Datagram Protocol (UDP) over Internet Protocol (IP) network connection. Examples of control protocols that may be used when communicating between controller server 18 and controller clients 30 over the network connection include SNMP and OpenFlow protocol stack version 1.0.0 (as examples).

Flow table 28 contains flow table entries (e.g., rows in the table) that have multiple fields (sometimes referred to as header fields). The fields in a packet that has been received by switch 14 can be compared to the fields in the flow table. Each flow table entry may have associated actions. When there is a match between the fields in a packet and the fields in a flow table entry, the corresponding action for that flow table entry may be taken.

Figure 6A:
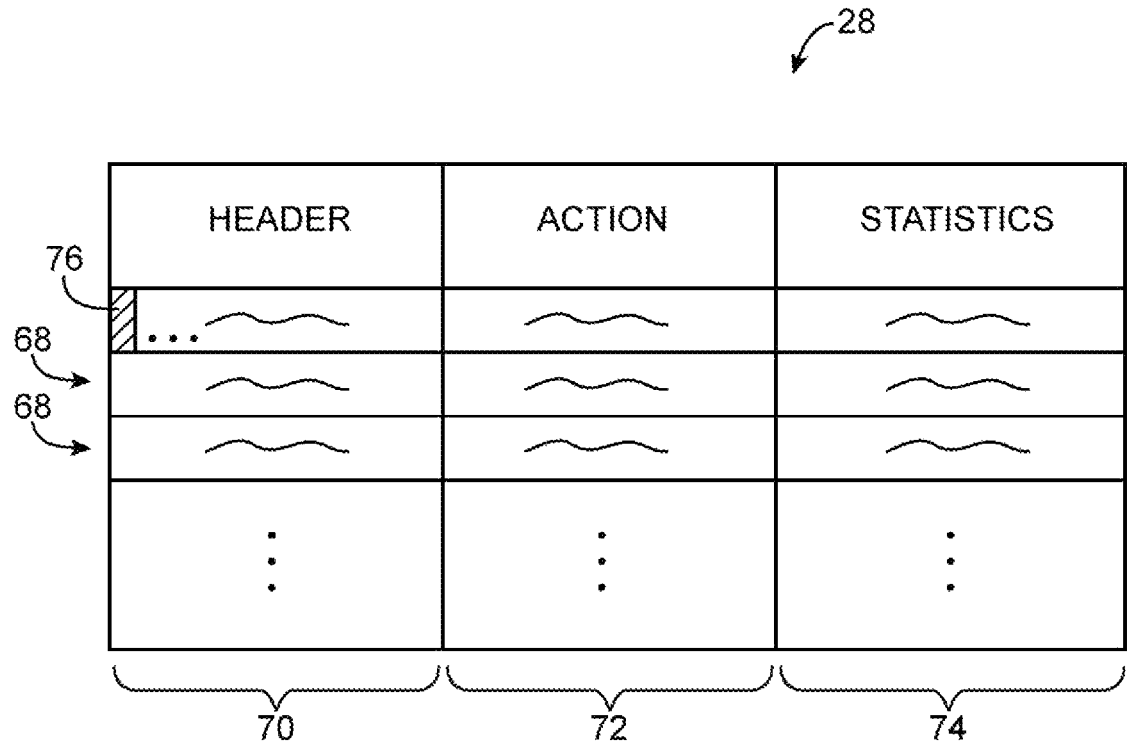
FIG. 6A is a diagram of an illustrative flow table of the type that may be used by a packet processing system in accordance with an embodiment of the present invention.

An illustrative flow table is shown in FIG. 6. As shown in FIG. 6A, table 28 may have flow table entries (row) 68. Each flow table entry may be associated with header 70, action 72, and statistics 74. Headers 70 may each include multiple header fields 76. The action in each flow table entry indicates what action switch 14 is to perform on the packet when a match is detected between the fields in the packet and the corresponding fields in the header of that flow table entry. Switch 14 may maintain statistical data (counter values) in the statistics portion of flow table 28 that can be queried by controller server 18 when it is desired to obtain information on the performance of switch 14.

The header fields in header 70 (and the corresponding fields in each incoming packet) may include the following fields: ingress port (i.e., the identity of the physical port in switch 14 through which the packet is being received), Ethernet source address, Ethernet destination address, Ethernet type, virtual local area network (VLAN) id, VLAN priority, IP source address, IP destination address, IP protocol, IP ToS (type of service) bits, Transport source port/Internet Control Message Protocol (ICMP) Type (sometimes referred to as source TCP port), and Transport destination port/ICMP Code (sometimes referred to as destination TCP port). Other fields may be used if desired. For example, a network protocol field and a protocol port field may be used.

Each flow table entry (flow entry) is associated with zero or more actions that dictate how the switch handles matching packets. If no forward actions are present, the packet is preferably dropped. The actions that may be taken by switch 14 when a match is detected between packet fields and the header fields in a flow table entry may include the following actions: forward (e.g., ALL to send the packet out on all interfaces, not including the incoming interface, CONTROLLER to encapsulate and send the packet to the controller server, LOCAL to send the packet to the local networking stack of the switch, TABLE to perform actions in flow table 28, IN_PORT to send the packet out of the input port, NORMAL to process the packet with a default forwarding path that is supported by the switch using, for example, traditional level 2, VLAN, and level 3 processing, and FLOOD to flood the packet along the minimum spanning tree, not including the incoming interface). Additional actions that may be taken by switch 14 include: an enqueue action to forward a packet through a queue attached to a port and a drop action (e.g., to drop a packet that matches a flow table entry with no specified action). Modify-field actions may also be supported by switch 14. Examples of modify-field actions that may be taken include: Set VLAN ID, Set VLAN priority, Strip VLAN header, Modify Ethernet source MAC (Media Access Control) address, Modify Ethernet destination MAC address, Modify IPv4 source address, Modify IPv4 ToS bits, Modify transport destination port.

FIG. 6B is an illustrative flow table having three flow table entries. The entries include fields with wildcards (e.g., "*" symbols). When a wildcard is present in a particular field, all incoming packets will be considered to form a "match" with respect to the field, regardless of the particular value of the field in the incoming packet.

The entry of the first row of the FIG. 6B table directs the switch in which the flow table entry is operating to perform Ethernet switching. In particular, incoming packets with matching Ethernet destination addresses are forwarded to port 3.

The entry of the second row of table of FIG. 6B illustrates how a switch may be configured to perform internet routing (i.e., packets are forwarded based on their destination IP address).

The third row of the table of FIG. 6B contains an entry that illustrates how a switch may be configured to perform firewalling. When a packet is received that has a destination IP port value of 80, that packet is dropped (i.e., the switch is configured to serve as a firewall that blocks port 80 traffic).

Flow table entries of the type shown in FIG. 6B may be loaded into a switch 14 by controller server 18 during system setup operations or may be provided to a switch 14 from controller server 18 in real time in response to receipt and processing of packets at controller server 18 from switch 14. In a network with numerous switches 14, each switch can be provided with appropriate flow table entries to form a path through the network.

Consider, as an example, a network that contains first and second switches connected in series between respective end hosts. When sending traffic from a first of the end hosts to a second of the end hosts, it may be desirable to route traffic through the first and second switches. If the second switch is connected to port 3 of the first switch, if the second end host is connected to port 5 of the second switch, and if the destination IP address of the second end host is 172.12.3.4, controller server 18 may provide the first switch with the flow table entry of FIG. 6C and may provide the second switch with the flow table entry of FIG. 6D. When packets with destination IP address 172.12.3.4 are received at the first switch, they are forwarded to the second switch in accordance with the "forward to port 3" action in the FIG. 6C table. When these packets are received at the second switch, they are forwarded to the second end host that is connected to port 5 of the second switch in accordance with the "forward to port 5" action in FIG. 6D.

Figure 7:
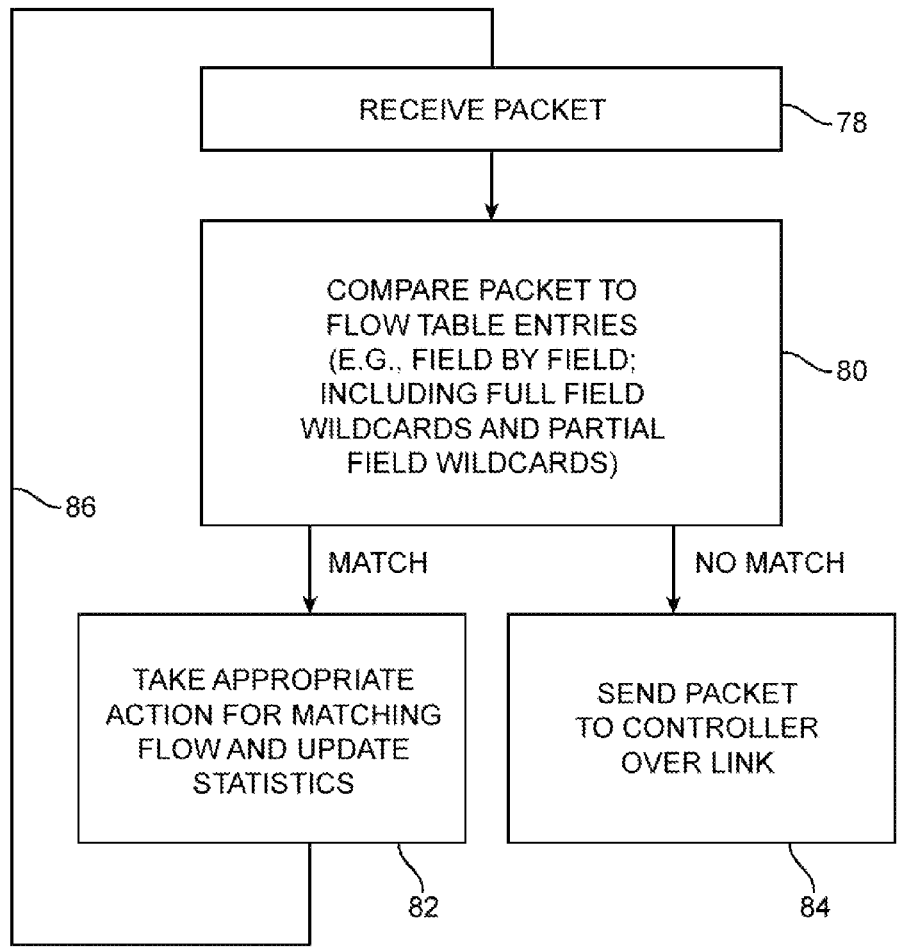
FIG. 7 is a flow chart of illustrative steps involved in processing packets in a packet processing system in accordance with an embodiment of the present invention.

Illustrative steps that may be performed by switch 14 in processing packets that are received on input-output ports 34 are shown in FIG. 7. At step 78, switch 14 receives a packet on one of its ports (e.g., one of input-output ports 34 of FIG. 1).

At step 80, switch 14 compares the fields of the received packet to the fields of the flow table entries in the flow table 28 of that switch to determine whether there is a match. Some fields in a flow table entry may contain complete values (i.e., complete addresses). Other fields may contain wildcards (i.e., fields marked with the "don't care" wildcard character of "*"). Yet other fields may have partially complete entries (i.e., a partial address that is partially wildcarded). Some fields may use ranges (e.g., by restricting a TCP port number to a value between 1 and 4096) and in effect use the range to implement a type of partial wildcarding. In making field-by-field comparisons between the received packet and the flow table entries, switch 14 can take into account whether or not each field in the flow table entry contains a complete value without any wildcarding, a partial value with wildcarding, or a wildcard character (i.e., a completely wildcarded field).

If it is determined during the operations of step 80 that there is no match between the fields of the packet and the corresponding fields of the flow table entries, switch 14 may send the packet to controller server 18 over link 16 (step 84).

If it is determined during the operations of step 80 that there is a match between the packet and a flow table entry, switch 14 may perform the action that is associated with that flow table entry and may update the counter value in the statistics field of that flow table entry (step 82). Processing may then loop back to step 78, so that another packet may be processed by switch 14, as indicated by line 86.

Figure 8:
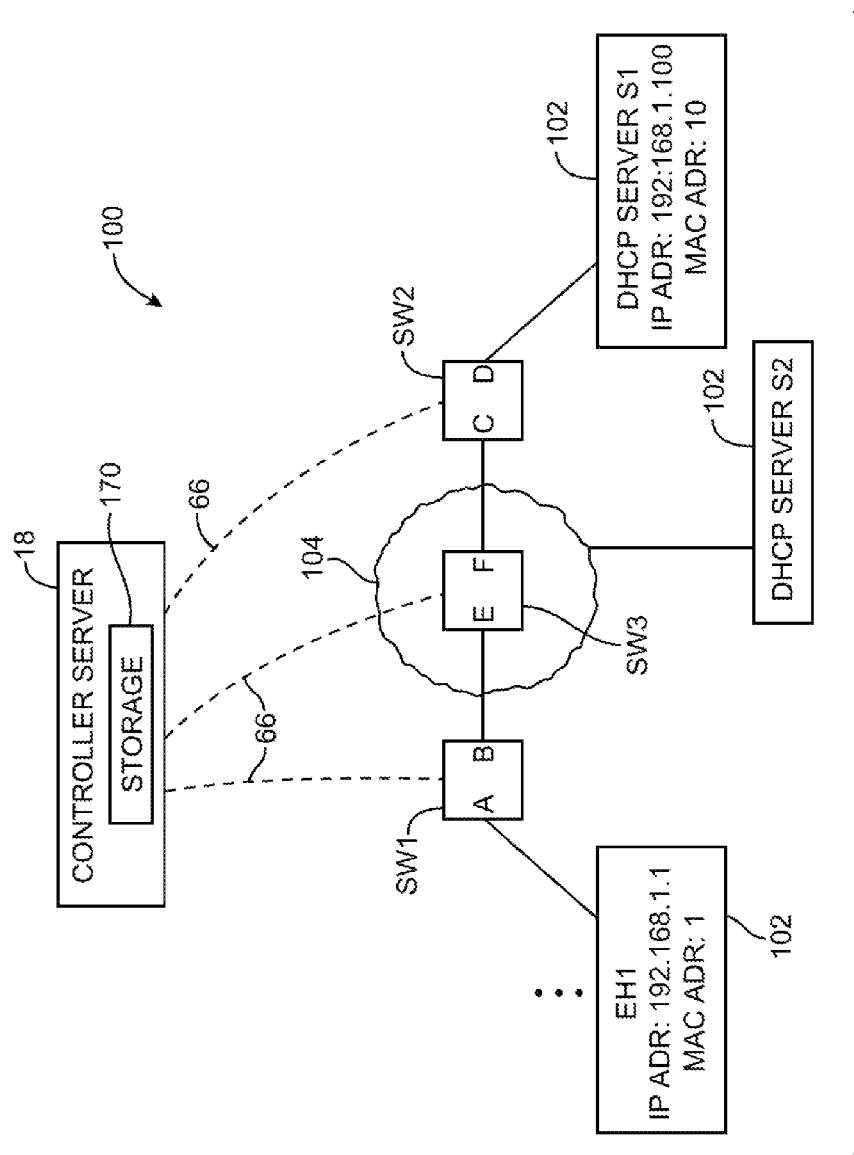
FIG. 8 is a diagram of an illustrative network in which an end host may request an Internet Protocol (IP) address from Dynamic Host Configuration Protocol (DHCP) servers in accordance with an embodiment of the present invention.

A controller (e.g., a controller server or other controllers implemented on computing equipment) that controls a network of switches may gather or monitor network information such as network topology or information associated with end hosts. The controller may include one or more controller servers or may be distributed throughout one or more of the switches (e.g., portions of the controller may be implemented on storage and processing circuitry of multiple switches). The controller may monitor the network locations of end hosts or monitor connections between switches in the network. The controller may reduce network traffic load on the network by using the network information to control the flow of network traffic between end hosts. FIG. 8 shows an illustrative scenario in which controller server 18 may use network information to reduce unnecessary network traffic in network 100.

As shown in FIG. 8, network 100 may include end hosts 102 that are coupled to switches in network 100. The switches may have ports to which end hosts or other switches are coupled. Switch SW1 may have ports A and B that are coupled to end host EH1 and port E of switch SW3, respectively. Switch SW2 may have ports C and D that are coupled to port F of switch SW3 and DHCP server S1, respectively. The example of switches SW1 and SW2 that are coupled via a single switch SW3 is merely illustrative. If desired, switch SW1 may be coupled to switch SW2 via any number of intermediate switches (e.g., tens, hundreds, thousands or more) that form network portion 104.

End hosts 102 may include DHCP servers such as DHCP server S1 and DHCP server S2 that provide Internet Protocol (IP) addresses to other end hosts in network 100. DHCP server S1 and DHCP server S2 may each be allocated a respective portion of available IP addresses (e.g., a network administrator may allocate IP addresses to each DHCP server from a pool of possible IP addresses). For example, DHCP server S1 may be allocated IP addresses between 192.168.1.0 to 192.168.1.255. In this scenario, DHCP server S1 may provide end host EH1 with IP address 192.168.1.1. End host EH1 may then communicate with other end hosts in network 100 using IP address 192.168.1.1. For example, network packets sent from end host EH1 may include header fields indicating that the network packets were sent from IP address 192.168.1.1. Other end hosts in network 100 may send network packets to end host EH1 by sending the network packets to IP address 192.168.1.1.

To obtain an IP address, end host EH1 may communicate with DHCP servers using the Dynamic Host Configuration Protocol (DHCP). FIGS. 9A, 9B, 9C, 9D, 9E, and 9F show illustrative DHCP network packets that may be used to assign an IP address to end host EH1.

When end host EH1 initially connects to network 100, end host EH1 may already have a corresponding hardware address (e.g., a MAC address or other Ethernet address). To communicate with other end hosts, end host EH1 may be required to obtain an IP address from a DHCP server.

Figure 9A:
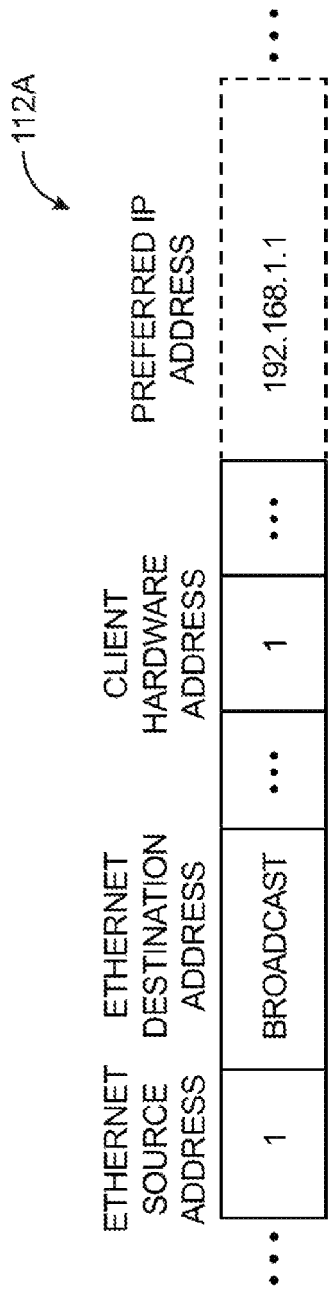
FIG. 9A is an illustrative DHCP discovery request packet that may be sent by an end host to request an IP address from DHCP servers in accordance with an embodiment of the present invention.

FIG. 9A shows an illustrative DHCP discovery request packet 112A that end host EH1 may use to request an IP address from DHCP servers in network 100. As shown in FIG. 9A, DHCP discovery request 112A may include an Ethernet source address, Ethernet destination address, client hardware address, and optionally a preferred IP address or other desired options. The Ethernet source address and the client hardware address may be the hardware address (e.g., MAC address) of end host EH1. The Ethernet destination address may be a broadcast address (e.g., indicating that DHCP discovery request 112A should be flooded throughout network 100). DHCP discovery request packet 112A may be referred to as a broadcast packet, because the packet is addressed to all end hosts in network 100.

End host EH1 may indicate a preferred IP address 192.168.1.1 in DHCP discovery request 112A. This example is merely illustrative. If desired, end host EH1 may include any preferred IP address (e.g., 192.168.1.99, 192.168.1.30, etc.) and may optionally include other information such as information relating to a hardware or firmware type of end host EH1. End host EH1 may send DHCP discovery request 112A to a client switch that is coupled to end host EH1 (e.g., client switch SW1). In response to receiving DHCP discovery request 112A, client switch SW1 may forward DHCP discovery request 112A to controller server 18. In response to receiving DHCP discovery request 112A, controller server 18 may identify whether a suitable DHCP server is known to controller server 18.

Controller server 18 may identify a suitable DHCP server by retrieving DHCP server information from a database. For example, controller server 18 may retrieve address information (e.g., a network address and a hardware address) of DHCP server S1 from a database stored in storage 170. The database may include information relating to previously identified DHCP servers.

Figure 9B:
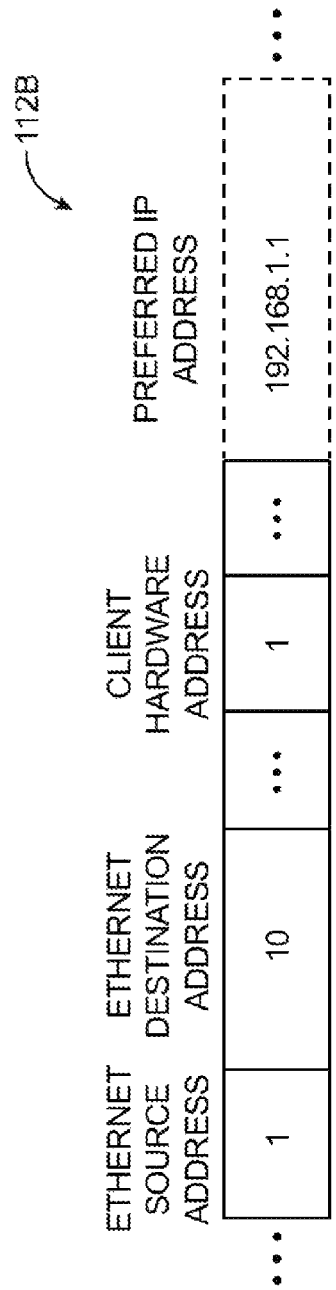
FIG. 9B is an illustrative controller-modified DHCP discovery request packet that may be forwarded directly to a DHCP server in accordance with an embodiment of the present invention.

In response to identifying a suitable DHCP server for fulfilling DHCP discovery request 112A, controller server 18 may form controller-modified DHCP discovery request 112B of FIG. 9B. Controller-modified DHCP discovery request 112B may be formed by replacing the broadcast Ethernet destination address of DHCP discovery request 112A with a hardware address of the identified DHCP server (e.g., a hardware address retrieved from the database). Controller server 18 may use the hardware address and other retrieved address information to generate a packet forwarding path from end host EH1 to DHCP server S1. Controller server 18 may generate the packet forwarding path between end host EH1 and DHCP server S1 through client switches SW1, SW3, and SW2 (e.g., by providing appropriate flow table entries or other packet forwarding rules that direct the client switches to forward network packets between end host EH1 and DHCP server S1). Controller server 18 may then direct client switch SW1 to forward controller-modified DHCP discovery request 112B to DHCP server S1 along the generated packet forwarding path. By forming a packet forwarding path that directly routes controller-modified DHCP discovery request 112B to DHCP server S1, controller server 18 may help prevent unnecessary network traffic associated with broadcasting DHCP discovery request 112A.

Controller-modified DHCP discovery request packet 112B may be referred to as a unicast packet, because the packet is addressed to a single end host (e.g., DHCP server S1).

Figure 9C:
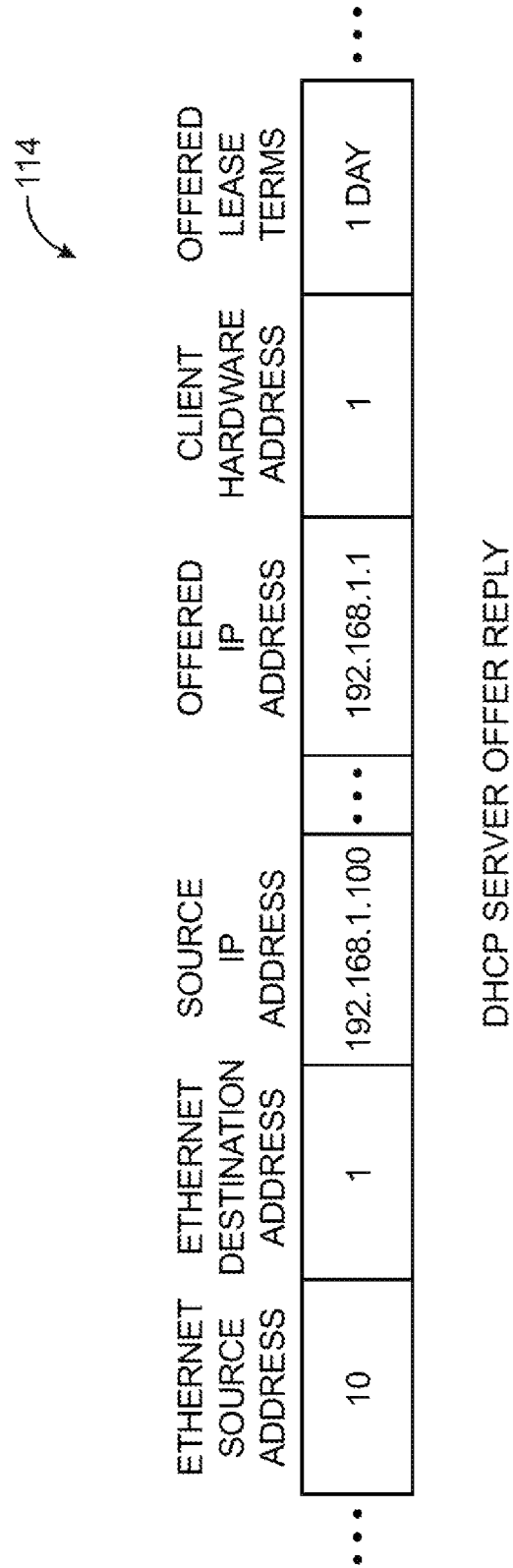
FIG. 9C is an illustrative DHCP server offer reply packet that may be sent by a DHCP server to offer an IP address to an end host with an embodiment of the present invention.

In response to receiving controller-modified DHCP discovery request 112B, DHCP server S1 may allocate an available IP address to end host EH1 (e.g., an IP address that is not currently assigned to another end host or network device) and respond to the request by sending DHCP server offer reply packet 114 of FIG. 9C.

DHCP server offer reply 114 may include an Ethernet source address, Ethernet destination address, source IP address, offered IP address, client hardware address, optional lease terms, and other options related to offering an IP address to end host EH1. The Ethernet source address may be the hardware address (e.g., Ethernet address) of DHCP server S1, the Ethernet destination address and the client hardware address may be the client hardware address retrieved from a corresponding DHCP discovery request 112, the source IP address may be the IP address of DHCP server S1, and the offered IP address may be the IP address that has been allocated by DHCP server S1 to end host EH1. The optional lease terms may identify conditional terms associated with the offer (e.g., conditional terms that must be accepted by end host EH1 before the offered IP address is assigned to end host EH1). For example, the optional lease terms may include a length of time that the IP address will be allocated to end host EH1 (e.g., one day). In this scenario, the allocation of IP address 192.168.1.1 to end host EH1 expires after one day.

DHCP server S1 may send DHCP server offer reply 114 to client switch SW2. If a packet forwarding path does not exist for DHCP server offer reply 114, client switch SW2 may forward DHCP server offer reply 114 to controller server 18. If a packet forwarding path has already been generated (e.g., in response to DHCP discovery request 112), client switch SW2 may forward DHCP server offer reply 114 to end host EH1 along the previously-generated packet forwarding path.

In response to receiving DHCP server offer reply 114, controller server 18 may generate a packet forwarding path between DHCP server S1 and end host EH1 and direct client switch SW2 to forward DHCP server offer reply 114 directly to end host EH1 along the packet forwarding path.

Controller server 18 may use information retrieved from DHCP packets such as DHCP server offer reply 114 to store DHCP server information (e.g., in a database in storage 170). For example, controller server 18 may retrieve DHCP server information such as network addresses and a DHCP server hardware address from DHCP server offer reply 114 and store the retrieved DHCP server information. Controller server 18 may use the stored DHCP server information to respond to future DHCP request packets. For example, in response to receiving DHCP server offer reply 114 from DHCP server S1, controller server 18 may store the IP address and the MAC address of DHCP server S1 (i.e., 192.168.1.100 and 10, respectively). In this scenario, controller server 18 may respond to future DHCP discovery requests by forwarding the future DHCP discovery requests to DHCP server S1 (e.g., because DHCP server S1 is known).

In response to receiving DHCP server offer reply 114 from DHCP server S1, end host EH1 may reply with DHCP offer request 116A of FIG. 9D. DHCP offer request 116A may indicate that end host EH1 accepts the IP address that was offered by DHCP server S1 via DHCP server offer reply 114.

As shown in FIG. 9D, DHCP offer request 116A may include an Ethernet source address (e.g., the MAC address of end host EH1), an Ethernet destination address, a DHCP server IP address, and an end host IP address. The Ethernet destination address may be a broadcast address. The DHCP server IP address may be the IP address of the DHCP server that sent DHCP server offer reply 114. End host EH1 may retrieve the DHCP server IP address from the source IP address field of DHCP server offer reply 114. The end host IP address may be the offered IP address that is being accepted (e.g., end host IP address may be retrieved from the offered IP address field of DHCP server offer reply 114). End host EH1 may send DHCP offer request 116A to client switch SW1 and client switch SW1 may forward DHCP offer request 116A to controller server 18.

In response to receiving DHCP offer request 116A, controller server 18 may form controller-modified DHCP offer request packet 116B of FIG. 9E by replacing the broadcast address with the Ethernet address of DHCP server S1. Controller server 18 may forward controller-modified DHCP offer request 116B to DHCP server S1 instead of DHCP offer request packet 116A (e.g., by providing appropriate flow table entries to the client switches).

Figure 9F:
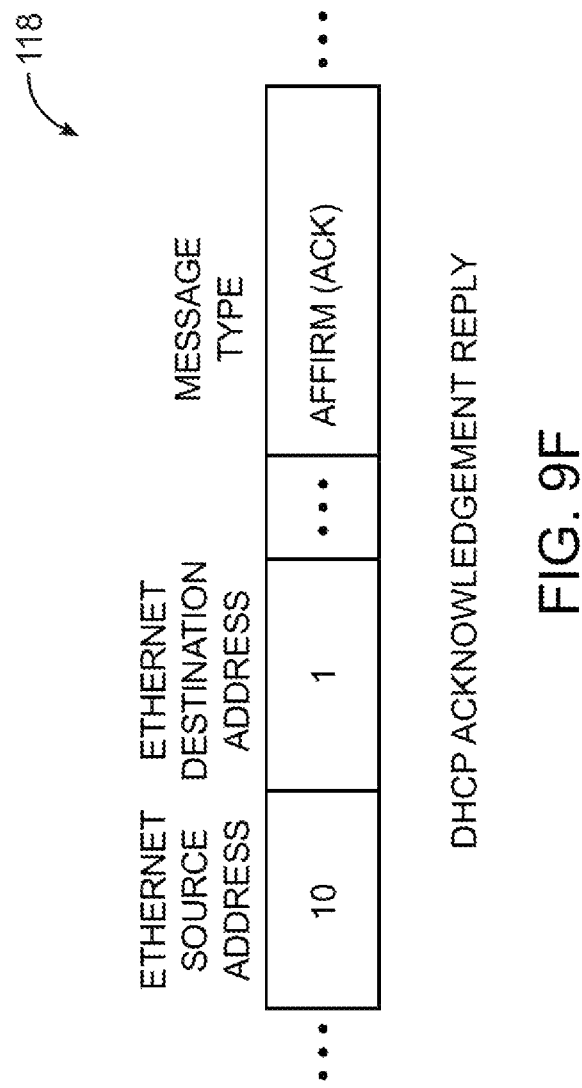
FIG. 9F is an illustrative DHCP acknowledgement reply packet that may be sent by a DHCP server to affirm assignment of an IP address to an end host in accordance with an embodiment of the present invention.

In response to receiving DHCP offer request 116B, DHCP server S1 may respond with DHCP acknowledgement reply 118 of FIG. 9F. As shown in FIG. 9F, DHCP acknowledgement reply 118 may include an Ethernet source address set to the hardware address of DHCP server S1 and an Ethernet destination address set to the hardware address of end host EH1. DHCP acknowledgement reply 118 may affirm the assignment of the allocated IP address to end host EH1 via a message type field (e.g., the message type may be "affirm" or "ACK"). If a packet forwarding path has already been generated, client switch SW2 may forward DHCP acknowledgement reply 118 to end host EH1. If no packet forwarding path has been generated, controller server 18 may receive DHCP acknowledgement reply 118 (e.g., via client switch SW2) and forward DHCP acknowledgment reply 118 directly to end host EH2.

The packet fields shown in FIGS. 9A-9F are merely illustrative. If desired, other packet fields such as DHCP data fields, IP header fields, Ethernet header fields, etc. may be included in DHCP packets such as DHCP requests and DHCP replies. For example, DHCP packets may be sent using the User Datagram Protocol (UDP). In this scenario, the DHCP packets may include UDP header fields such as source and destination IP addresses. DHCP request packets from end hosts that have not yet been assigned an IP address may include invalid source IP addresses such as 0.0.0.0. DHCP reply packets to end hosts that have not yet been assigned an IP address may include broadcast destination IP addresses such as 255.255.255.255 or offered end host IP addresses.

Figure 10:
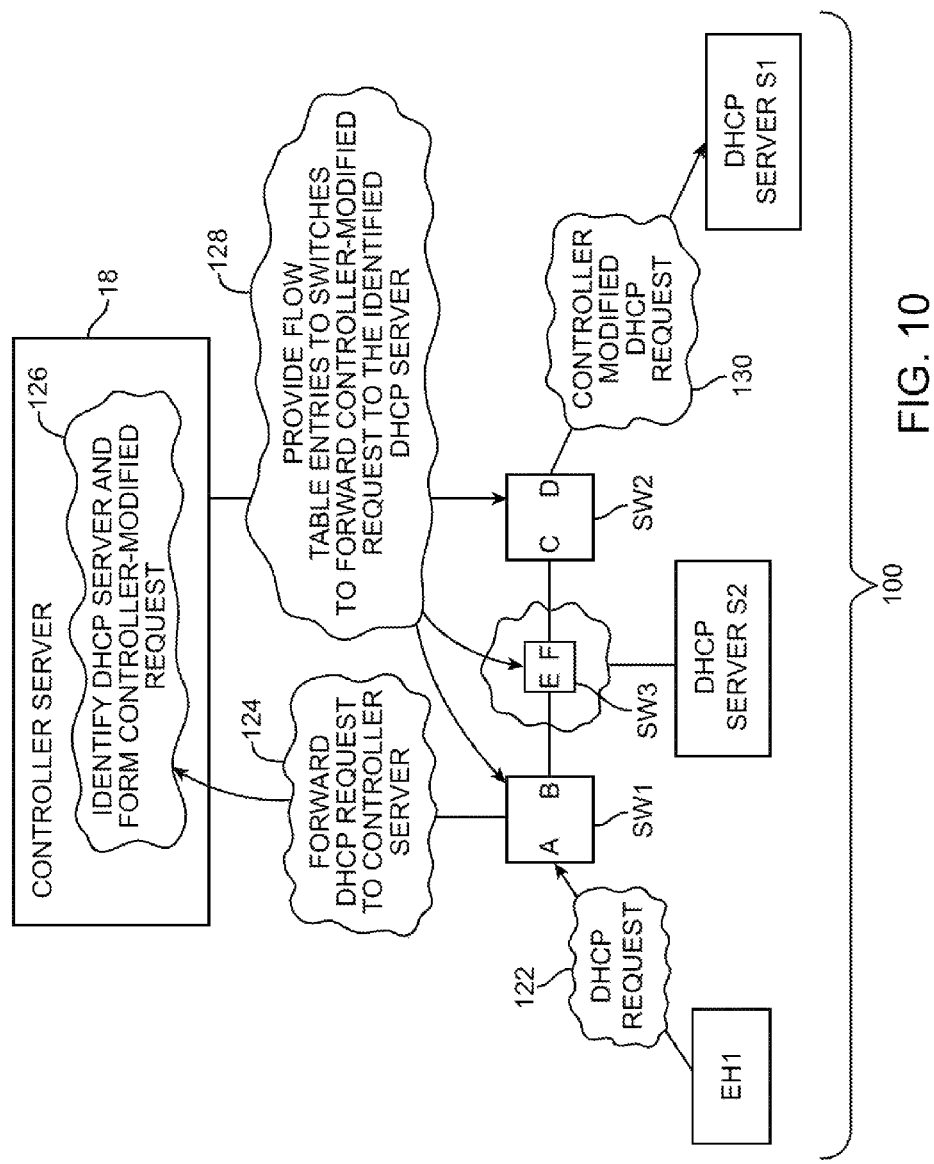
FIG. 10 is an illustrative diagram of steps that may be performed using a controller to forward a DHCP request from an end host to a known DHCP server in accordance with an embodiment of the present invention.

FIG. 10 shows an illustrative diagram of how controller server 18 may forward a DHCP request (e.g., DHCP discovery request 112 of FIG. 9A or DHCP offer request 116 of FIG. 9C) directly from end host EH1 to DHCP server S1.

In step 122, end host EH1 may send the DHCP request to port A of client switch SW1. End host EH1 may indicate that the DHCP request should be broadcasted throughout network 100 (e.g., by providing a broadcast address in an Ethernet destination address field of the DHCP request).

In step 124, client switch SW1 may receive the DHCP request from end host EH1 and examine a corresponding flow table to determine how to process the DHCP request. In response to determining that no flow table entries exist for the DHCP request or that the flow table entries direct client switch SW1 to forward the DHCP request to controller server 18, client switch SW may forward the DHCP request to controller server 18.

In step 126, controller server 18 may identify an appropriate DHCP server. Controller server 18 may identify an appropriate DHCP server by retrieving DHCP server information (e.g., network address, hardware address, etc.) from a database. Controller server 18 may form a controller-modified request (e.g., controller-modified DHCP discovery request 112B of FIG. 9B) using the retrieved DHCP server information.

In step 128, controller server 18 may form a packet forwarding path by providing flow table entries to the client switches that direct the client switches to forward the controller-modified DHCP request to the identified DHCP server. Controller server 18 may provide flow table entries to client switches SW1, SW2, and SW3 that direct client switch SW1 to forward the controller-modified DHCP request from port A to port B, that direct client switch SW3 to forward the controller-modified DHCP request from client switch SW1 to client switch SW2, and that direct client switch SW2 to forward the controller-modified DHCP request from port C to port D.

In step 130, the controller-modified DHCP request may be forwarded from end host EH1 to DHCP server S1 along the packet forwarding path through the switches. For example, controller server 18 may provide the controller-modified DHCP request to client switch SW1 and instruct client switch SW1 to forward the controller-modified DHCP request along the packet forwarding path.

By forming a packet forwarding path that forwards packets directly between end host EH1 and DHCP server S1, controller server 18 may prevent unnecessary broadcasting of DHCP packets. For example, controller server 18 may prevent the DHCP requests from being forwarded by the switches to DHCP server S2, even though the requests may be formed by end hosts with broadcast Ethernet destination addresses.

The example of FIG. 10 in which controller server 18 forms a packet forwarding path through the switches is merely illustrative. If desired, controller server 18 can forward DHCP requests and/or replies through controller server 18. For example, controller server 18 may receive DHCP discovery request 112 from end host EH1, send DHCP discovery request 112 to client switch SW2 (e.g., via network paths 66 of FIG. 8), and direct client switch SW2 to forward DHCP discovery request 112 to DHCP server S1 via port D.

DHCP requests such as DHCP discovery request 112A may be sent by end hosts to specific DHCP servers. For example, if an end host wishes to renew a lease (e.g., due to expiration of a lease term), the end host may send a DHCP discovery request that is destined for a given DHCP server (e.g., a DHCP discovery request with a specific destination IP address instead of a broadcast IP address). If desired, controller server 18 may be configured by a network administrator to allow DHCP requests to reach authorized DHCP servers and to deny DHCP requests from reaching non-authorized DHCP servers. The authorized DHCP servers may be provided by the network administrator to controller server 18 as a list of authorized DHCP servers. The list of authorized DHCP servers may be stored in storage 170 of controller server 18. Controller server 18 may be configured by the network administrator in a static mode in which controller server 18 allows DHCP requests based on the list of authorized DHCP servers and in a normal mode in which controller server 18 allows all DHCP requests with specific destination IP addresses.

Figure 11:
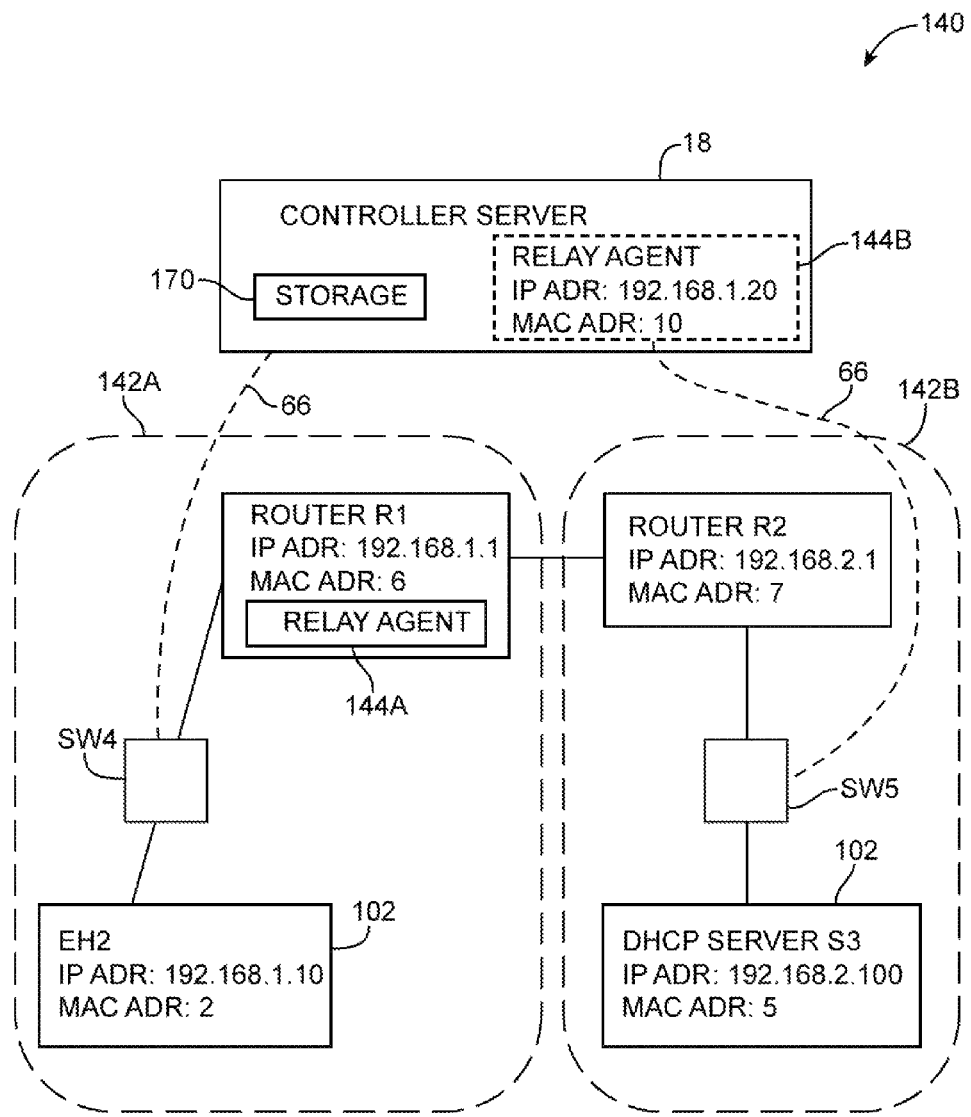
FIG. 11 is a diagram of an illustrative network in which an end host located in a first subnetwork may request an IP address from a DHCP server that is located in a second subnetwork in accordance with an embodiment of the present invention.

A network may sometimes be partitioned into subnetworks (sometimes referred to as subnets). Each subnetwork may include a router (e.g., a packet forwarding system that forwards packets based on IP header fields of the packets). Routers may sometimes be referred to as layer three switches. FIG. 11 shows an illustrative network 140 with subnetworks 142A and 142B that are associated with respective routers R1 and R2. Network 140 may include client switches such as SW4 and SW5 that are controlled by controller server 18 via network paths 66.

Each subnetwork may be associated with a range of IP addresses. Network devices in a given subnetwork may be assigned IP addresses in range of IP addresses corresponding to that subnetwork. Subnetwork 142A may be associated with IP addresses between 192.168.1.0 and 192.168.1.255, while subnetwork 142B may be associated with IP addresses between 192.168.2.0 and 192.168.2.255. End host EH2 and router R1 that are associated with subnetwork 142A may be assigned IP addresses of 192.168.1.10 and 192.168.1.1 (e.g., IP addresses that are within the range corresponding to subnetwork 142A). DHCP server S3 and router R2 that are associated with subnetwork 142B may be assigned IP addresses of 192.168.2.100 and 192.168.2.1. The IP addresses of routers and DHCP servers may be preconfigured (e.g., by a network administrator).

Each router may forward network packets between a corresponding subnetwork and other subnetworks. The network packets may be forwarded by the routers based on IP header fields such as destination IP addresses. For example, network packets sent from an end host in subnetwork 142A with a destination IP address associated with subnetwork 142B may be forwarded from router R1 to router R2.

A DHCP server may be configured to assign IP addresses to end hosts of multiple subnetworks. However, each router prevents network packets that have broadcast Ethernet destination addresses from reaching subnetworks that are not associated with the router. For example, router R1 may block broadcast Ethernet network packets that are sent by end host EH1 from reaching subnetwork 142B. In some scenarios, the routers may prevent DHCP broadcast packets from reaching the DHCP server.

For example, a DHCP discovery request packet that is broadcasted by end host EH2 may be blocked by router R1 before reaching DHCP server S3 (e.g., because all network packets from subnetwork 142A must pass through router R1 to reach subnetwork 142B). In this scenario, router R1 may be configured with a relay agent 144A that converts the broadcasted DHCP discovery request packet into a directed DHCP discovery request packet (e.g., by forming a directed network packet with a source IP address that is the IP address of router R1 and with a destination IP address that is the IP address of DHCP server S3). The directed DHCP discovery packet may sometimes be referred to as a unicast IP packet, because the directed DHCP discovery packet may be directed towards a single destination IP address.

Controller server 18 may be provided with information relating to the relay agents in network 140 (e.g., information relating to relay agent 144A may be provided to controller server 18 by a network administrator). To help reduce network load due to broadcasting of DHCP packets (e.g., due to switches that broadcast the DHCP packets throughout a corresponding subnetwork), controller server 18 may intercept DHCP request packets and convert the DHCP request packets into modified DHCP request packets that are destined for appropriate DHCP relay agents.

Consider the scenario in which end host EH2 sends a DHCP discovery request packet that requests assignment of an IP address to end host EH2. Client switch SW4 may receive the DHCP discovery request packet and forward the DHCP discovery request packet to controller server 18. In response to receiving the DHCP discovery request packet, controller server 18 may form controller-modified DHCP discovery request 112C shown in FIG. 12.

Figure 12:
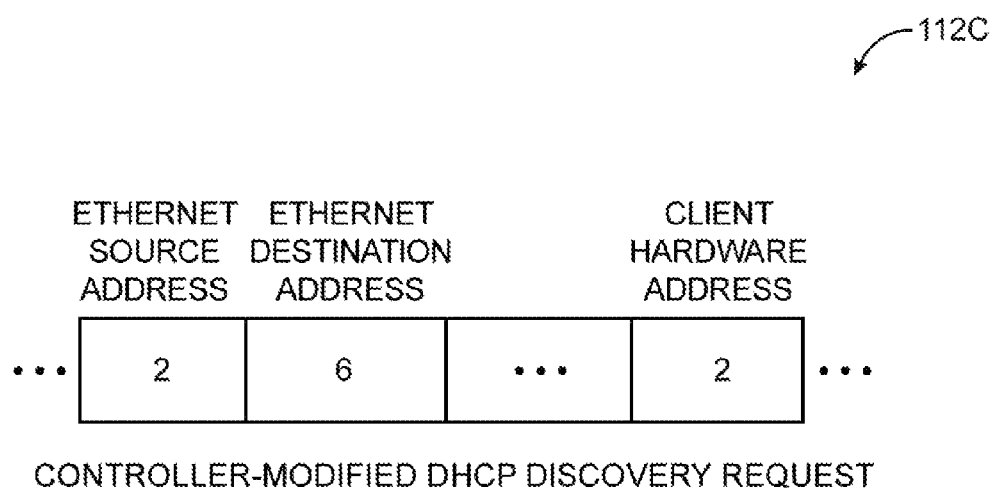
FIG. 12 is an illustrative controller-modified DHCP discovery request packet that may be formed by a controller server and sent to a relay agent.

As shown in FIG. 12, controller-modified DHCP discovery request 112C may include an Ethernet source address, Ethernet destination address, and a client hardware address. The Ethernet source address and the client hardware address may be the hardware address of end host EH2 (e.g., the MAC address of end host EH2). The Ethernet destination address may be the hardware address of router R1 (e.g., the router associated with relay agent 144A that is within the same subnetwork as end host EH2). Controller server 18 may determine the Ethernet address of relay agent 144A from a database provided by a system administrator.

Figure 13:
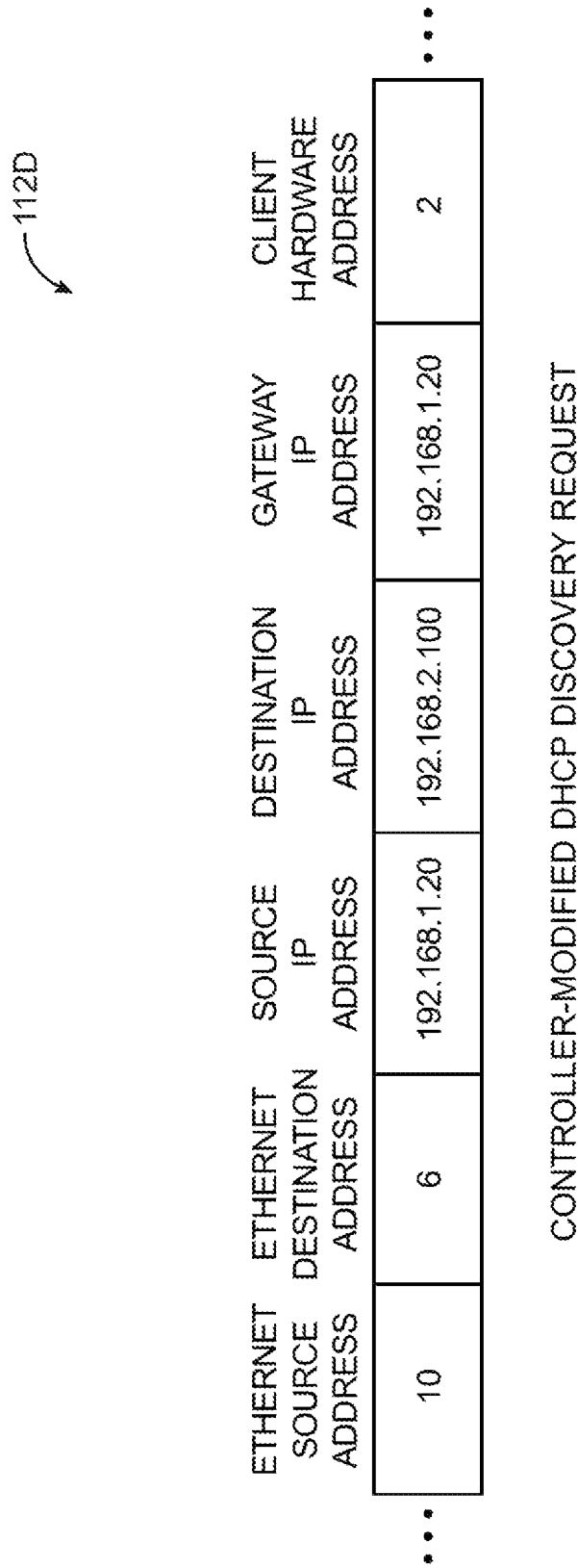
FIG. 13 is an illustrative controller-modified DHCP discovery request packet that may be formed by a controller that has built-in relay agent functionality in accordance with an embodiment of the present invention.

If desired, controller server 18 may be formed with a relay agent 144B that provides controller server 18 with the capability of forming controller-modified DHCP request packets that can be forwarded between subnetworks. Relay agent 144B may be associated with a reserved IP address (e.g., 192.168.1.20) and a MAC address (e.g., 10). If desired, relay agent 144B may be formed in place of relay agent 144A, because the functions performed by relay agent 144A may be performed by a controller server with relay agent 144B. FIG. 13 shows an illustrative controller-modified DHCP discovery request 112D that may be formed by controller server 18 that has a relay agent 144B in response to a DHCP discovery request packet sent by end host EH2.

As shown in FIG. 13, controller-modified DHCP discovery request packet 112D may include source and destination Ethernet addresses, source and destination IP addresses, a gateway IP address, and a client hardware address. The Ethernet and IP source addresses may be the MAC address and IP address of relay agent 144B. The Ethernet destination address may be the Ethernet address of router R1. The destination IP address may be the IP address of DHCP server S3. The gateway IP address may be the IP address of relay agent 144B. The client hardware address may be the client hardware address of end host EH2.

Figure 14:
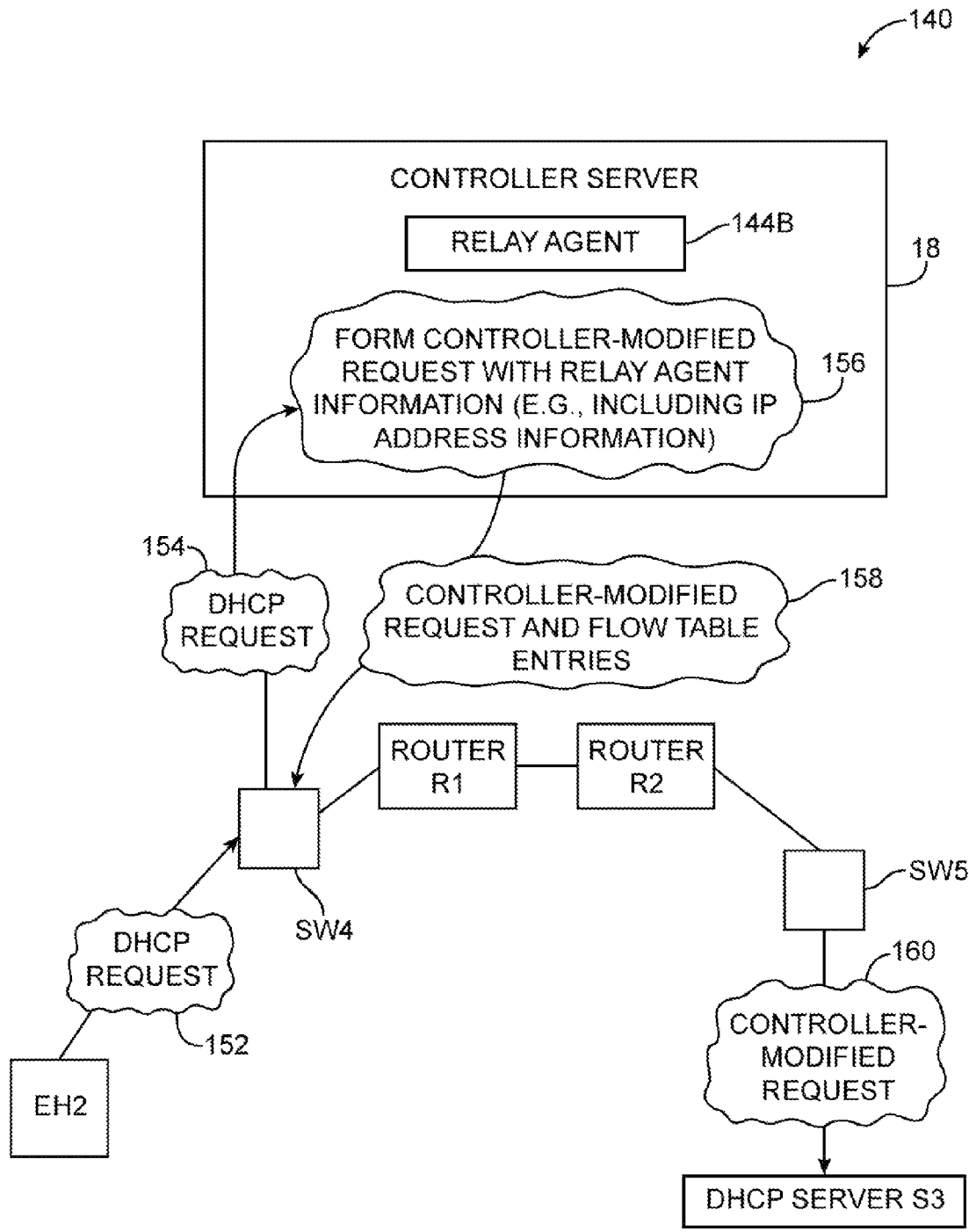
FIG. 14 is a diagram of illustrative steps involved with fulfilling DHCP requests with a controller server that has built-in relay agent functionality in accordance with an embodiment of the present invention.

FIG. 14 shows illustrative steps involved with using controller server 18 that has a corresponding relay agent 144B to generate controller-modified DHCP request packets such as controller-modified request packet 112D that can be forwarded between subnetworks.

In step 152, end host EH2 may send a DHCP request packet that requests assignment of an IP address to end host EH2 (e.g., a DHCP discovery request packet 112A with an Ethernet source address of 2). In step 154, switch SW4 may forward the DHCP request packet to controller server 18.

In step 156, controller server 18 may receive the DHCP request packet and form a controller-modified request packet using information such as IP address information from relay agent 144B. For example, controller server 18 may form controller-modified request packet 112C of FIG. 12 with additional packet header fields that identify a source IP address corresponding to relay agent 144B (e.g., 192.168.1.20) and a destination IP address that corresponds to DHCP server S3 (e.g., 192.168.2.100). By forming the controller-modified DHCP request packet with appropriate relay agent information and IP address information, controller server 18 may provide appropriate routing information for routers R1 and R2 (e.g., because routers R1 and R2 forward network packets based on IP address information).

In step 158, controller server 18 may send the controller-modified DHCP request packet and appropriate flow table entries to switch SW4. Switch SW4 may forward the controller-modified DHCP request packet along an appropriate packet forwarding path (e.g., using the flow table entries).

In step 160, the controller-modified DHCP request packet may be forwarded through the packet forward path (e.g., through routers R1 and R2 and switch SW5) to DHCP server S3. DHCP server S3 may retrieve the hardware address of end host EH2 and the IP address of relay agent 144B (e.g., from the client hardware address field and the gateway IP address field) and assign an appropriate IP address to end host EH2 based on the retrieved information.

Figure 15:
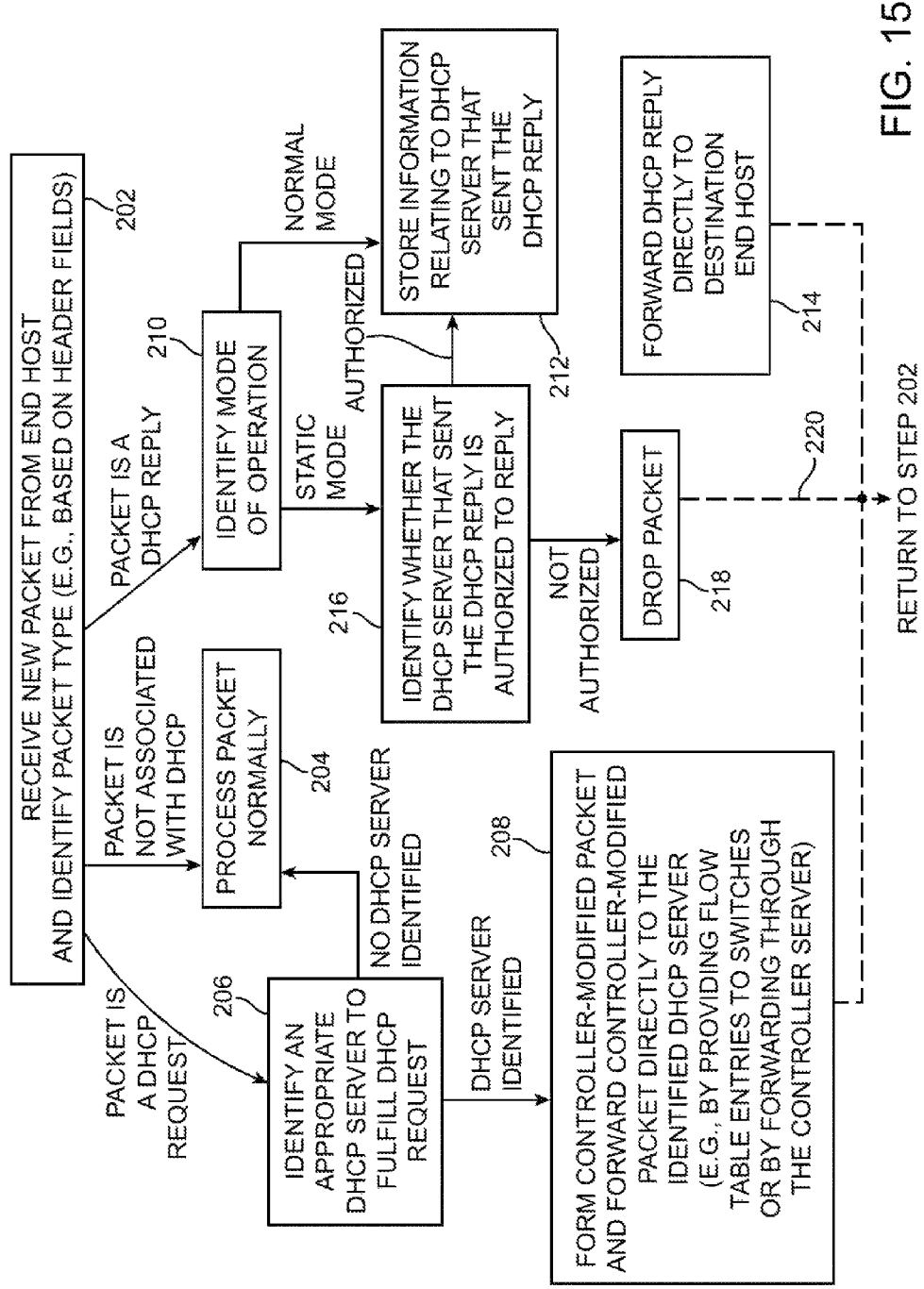
FIG. 15 is a flowchart of illustrative steps that may be performed by a controller to control the flow of DHCP packets between end hosts and DHCP servers in accordance with an embodiment of the present invention.

FIG. 15 shows a flowchart of illustrative steps that may be performed by controller server 18 to manage requests for network address assignments in a network.

In step 202, controller server 18 may receive a new packet from an end host. For example, the new packet may be forwarded by a client switch from an end host to controller server 18. Controller server 18 may identify a type of the packet (e.g., whether or not the packet is a DHCP request, a DHCP reply, or other types of packets). To identify the type of the packet, controller server 18 may retrieve packet information from header fields in the packet (e.g., Ethernet header fields, IP header fields, etc.).

In response to identifying that the packet is not associated with DHCP (e.g., that the packet is a non-DHCP packet), controller server 18 may perform the operations of step 204. In response to identifying that the packet is a DHCP request packet, controller server 18 may perform the operations of step 206. In response to identifying that the packet is a DHCP reply packet, controller server 18 may perform the operations of step 210.

In step 204, controller server 18 may process the packet normally. For example, controller server 18 may form a packet forwarding path for the packet to forward the packet between packet sources and packet destinations (e.g., if the packet has a specific destination IP address). As another example, controller server 18 may direct client switches to broadcast the packet (e.g., if the packet has a broadcast destination IP address).

In step 206, controller server 18 may identify an appropriate DHCP server to satisfy the DHCP request packet. Controller server 18 may identify the appropriate DHCP server by retrieving DHCP server information from a database or from other forms of storage. For example, controller server 18 may use hardware and network addresses stored in a database to identify an appropriate DHCP server. If controller server 18 is unable to identify an appropriate DHCP server, the operations of step 204 may be performed to broadcast the DHCP request throughout the network. If controller server is able to identify an appropriate DHCP server, the operations of step 208 may be performed.

In step 208, controller server 18 may form a controller-modified DHCP packet from the DHCP request using information retrieved for the identified DHCP server. For example, controller server 18 may form controller-modified DHCP offer request 116B from DHCP offer request 116A by replacing the broadcast Ethernet destination address of DHCP offer request 116A with the hardware address of the identified DHCP server.

Controller server 18 may forward the controller-modified DHCP packet directly to the identified DHCP server. For example, controller server 18 may provide flow table entries to client switches to form a packet forwarding path between the end host and the identified DHCP server. As another example, controller server 18 may forward the DHCP request packet through controller server 18 to a client switch that is coupled to the DHCP server and instruct the client switch to forward the DHCP request packet to the identified DHCP server. The process may then optionally return to step 202 via path 220 to process new packets from end hosts.

In step 210, controller server 18 may identify a mode of operation. Modes of operations may include a static mode and a normal mode. In other words, controller server 18 may determine whether the controller server is configured in a static mode or a normal mode. The normal mode may sometimes be referred to as a flood or forward mode. The mode of operation may be configured by a network administrator. In response to determining that controller server 18 is configured in a normal mode, the operations of step 212 may be performed. In response to determining that controller server 18 is configured in a static mode, the operations of step 216 may be performed.

In step 212, controller server 18 may store information of the DHCP server that sent the DHCP reply packet. The stored information may include network and hardware address information associated with the DHCP server (e.g., IP address information, Ethernet address information, etc.). The stored information may, for example, be stored in a database on controller server 18 and may be retrieved in step 206 to identify appropriate DHCP servers for fulfilling future DHCP requests.

In step 214, controller server 18 may forward the DHCP reply packet directly to a destination end host. Controller server 18 may retrieve the destination end host information from packet header fields of the DHCP reply packet. For example, controller server 18 may identify the destination end host from a hardware address retrieved from an Ethernet destination address field of the DHCP reply packet. Controller server 18 may forward the DHCP reply packet by providing appropriate flow table entries to the client switches to route the packet from the DHCP server that sent the reply packet to the destination end host. If desired, the DHCP reply packet may be forwarded through the controller server (e.g., forwarded by the controller server directly to a client switch coupled to the destination end host). The process may then return to step 202 via path 220 to process new packets from end hosts.

In step 216, controller server 18 may identify whether the DHCP server that sent the DHCP reply packet is authorized to send DHCP replies. For example, controller server 18 may have been configured by a network administrator with a list of authorized DHCP servers. In this scenario, controller server 18 may compare attributes (e.g., IP addresses, hardware addresses, etc.) of the DHCP server to entries in the list of authorized DHCP servers. If a match is found, controller server 18 may determine that the DHCP server is authorized to send DHCP replies and the operations of step 212 may be performed. If no match is found, controller server 18 may determine that the DHCP server is not authorized to send DHCP replies and the operations of step 218 may be performed.

In step 218, controller server 18 may drop the DHCP reply packet (e.g., so that the DHCP reply packet is not forwarded to a destination end host). The process may then return to step 202 via path 220 to process new packets from end hosts.

The use of one or more centralized controllers such as controller server 18 to control network switches is merely illustrative. If desired, any type of controller (e.g., a controller implemented on computing equipment) that controls a network of packet forwarding systems may be used to process network packets such as DHCP requests (e.g., to perform the steps of the flowchart of FIG. 15).

Figure 16:
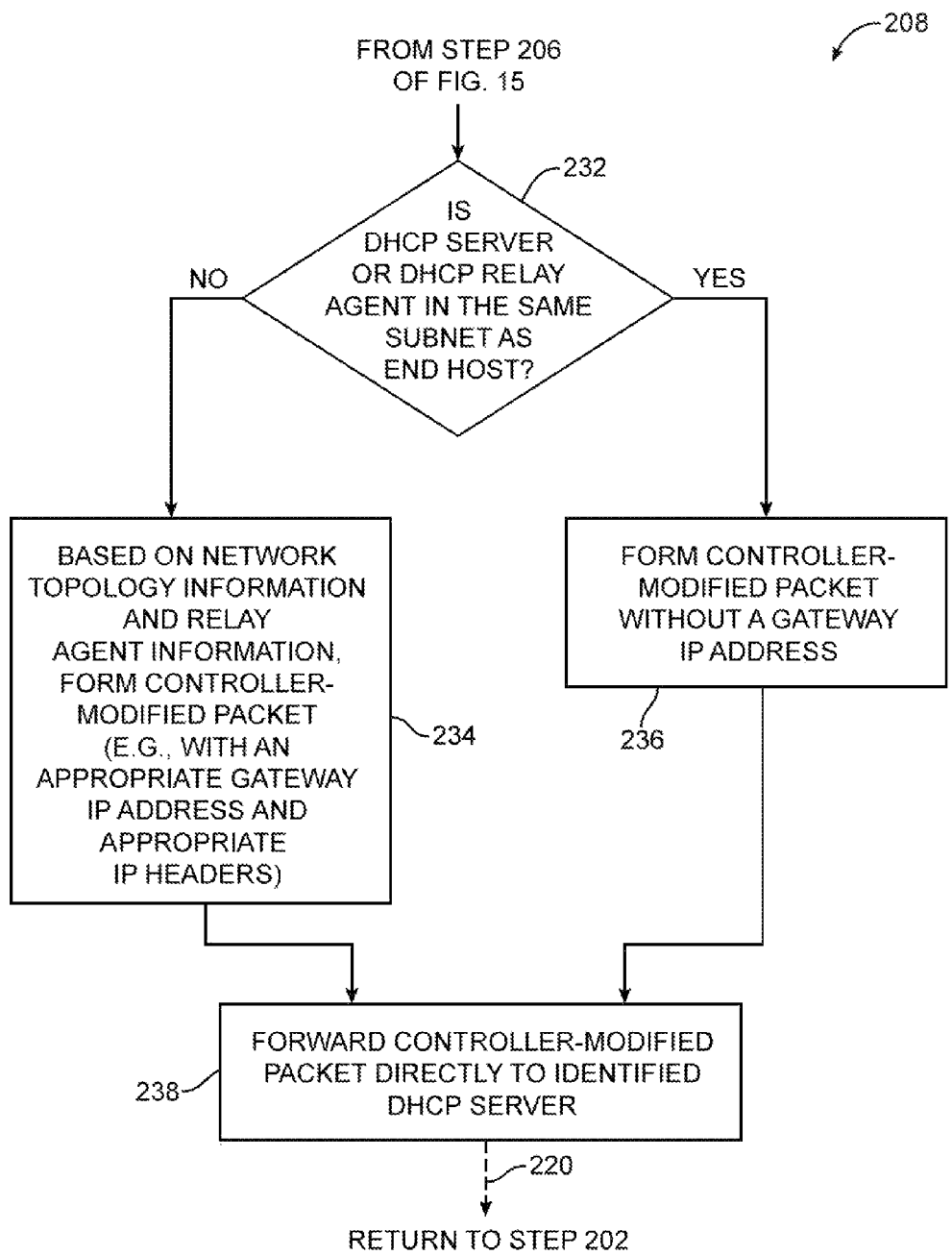
FIG. 16 is a flowchart of illustrative steps that may be performed by a controller to form a controller-modified DHCP request packet based on network topology information in accordance with an embodiment of the present invention.

The operations of step 208 may be performed based on network topology information. For example, controller server 18 may gather network topology information related to the partitioning of the network into subnetworks and their respective IP address ranges. As another example, controller server 18 may be provided with the network topology information by a network administrator. FIG. 16 shows a flowchart of illustrative steps that may be performed by controller server 18 using network topology information to form a controller-modified DHCP request packet and forward the controller-modified DHCP request packet to an identified DHCP server. The illustrative steps of FIG. 16 may be performed as part of step 208 of FIG. 15.

In step 232, controller server 18 may determine whether an identified DHCP server or a DHCP relay agent (e.g., a DHCP server identified in step 206 of FIG. 15) is in the same subnetwork as the end host that sent the DHCP request. For example, controller server 18 may use network topology information retrieved from storage such as storage 170 of controller server 18 to identify whether the end host is in the same subnetwork as a DHCP server. If controller server 18 determines that the end host is associated with a different subnetwork than the DHCP server, processing may perform the operations of step 234. If controller server 18 determines that the end host is associated with the same subnetwork as the DHCP server, processing may perform the operations of step 236.

In step 234, controller server 18 may form a controller-modified DHCP request packet with an appropriate gateway IP address and appropriate IP header fields (e.g., to convert the DHCP request packet into a unicast IP packet). To determine the appropriate gateway IP address, controller server 18 may use network topology information and relay agent information. For example, controller server 18 may be configured with a relay agent that has a corresponding IP and MAC addresses. In this scenario, controller server 18 may form the controller-modified packet with the address information of the relay agent. If desired, controller server 18 may retrieve the hardware address information of a relay agent from the database and form the controller-modified packet with the retrieved address information.

The IP header fields may be provided by controller server 18 so that routers that receive the controller-modified DHCP request packet correctly route the packet to the DHCP server (e.g., because the destination IP address field may be set to the IP address of the DHCP server).

In step 236, controller server 18 may form a controller-modified DHCP request packet without a gateway IP address (e.g., by providing a gateway IP address of 0.0.0.0). As an example, controller server 18 may form controller-modified DHCP discovery request 112B of FIG. 9A.

In step 238, Controller server 18 may forward the controller-modified DHCP request packet formed in either steps 234 or 236 to the DHCP server or the DHCP relay agent (e.g., by providing client switches in the network with appropriate packet forwarding rules or by forwarding controller-modified DHCP request packet through the controller server). Processing may then return to step 202 of FIG. 15 to process new packets received from end hosts.

Figure 17:
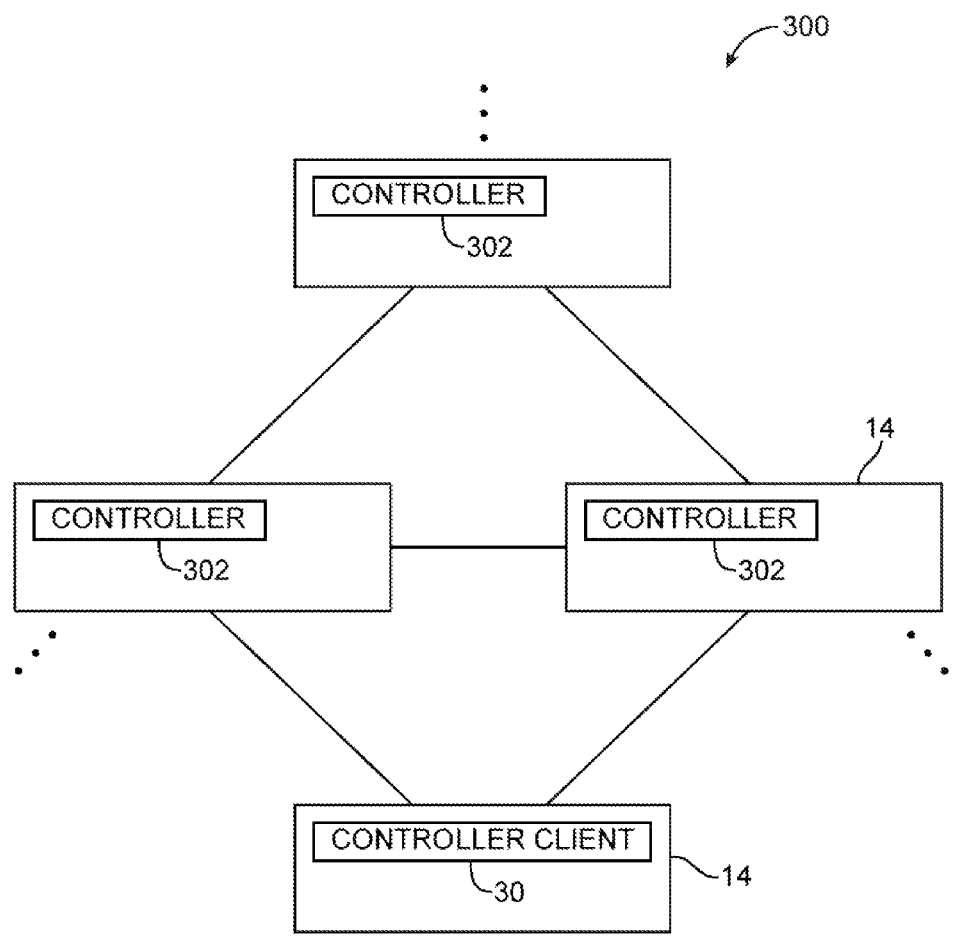
FIG. 17 is a diagram of an illustrative network in which a controller may be distributed throughout switches in the network in accordance with an embodiment of the present invention.

FIG. 17 shows an illustrative example in which controllers 302 may be distributed on switches 14 throughout network 300. Controllers 302 may be distributed on some or all of network switches 14. Controller clients such as controller client 30 may communicate with one or more of controllers 302 via network communications links (e.g., controllers 302 may send instructions to controller client 30 via the communications links). Controllers 302 may communicate with each other to collectively control switches 14 or may individually control switches 14.

As an example, controllers 302 may collectively control network 300 by communicating with each other. Controllers 302 may share information relating to network topology, network traffic, end hosts that are coupled to switches 14, etc. By sharing network information, controllers 302 may be able to gather DHCP server information and use the DHCP server information to process DHCP packets.

The foregoing is merely illustrative of the principles of this invention and various modifications can be made by those skilled in the art without departing from the scope and spirit of the invention.

What is claimed is:

1. A method of controlling traffic in a network of switches using a controller, the method comprising:
    with the controller, receiving a Dynamic Host Configuration Protocol request packet that is sent from an end host;
    based on network topology information associated with the network of switches, modifying the Dynamic Host Configuration Protocol request packet with the controller, wherein the network is partitioned into subnetworks associated with respective address ranges and wherein the end host is associated with a given subnetwork;
    with the controller, identifying a server for fulfillment of the Dynamic Host Configuration Protocol request packet;
    with the controller, identifying whether the server is associated with the given subnetwork based on the network topology information;
    in response to identifying that the server is associated with the given subnetwork, modifying an Ethernet address field of the Dynamic Host Configuration Protocol request packet; and
    in response to identifying that the server is not associated with the given subnetwork, modifying an Internet Protocol address field of the Dynamic Host Configuration Protocol request packet.

2. The method defined in claim 1 wherein identifying whether the server is associated with the subnetwork comprises:
    comparing an Internet Protocol address of the server to an address range of the given subnetwork.

3. The method defined in claim 1 wherein modifying the Internet Protocol address field of the Dynamic host Configuration Protocol request packet comprises:
    modifying a gateway Internet Protocol address field of the Dynamic Host Configuration Protocol request packet.

* * * * *